US011649329B2

(12) United States Patent
Razeem et al.

(10) Patent No.: US 11,649,329 B2
(45) Date of Patent: May 16, 2023

(54) POLYETHYLENE TEREPHTHALATE ALLOY HAVING TALC

(71) Applicant: OCTAL, Inc., Plano, TX (US)

(72) Inventors: Mohammed Razeem, Plano, TX (US); Chris DeArmitt, Cincinnati, OH (US)

(73) Assignee: OCTAL, INC., Plano, TX (US)

( * ) Notice: Subject to any disclaimer, the term of this patent is extended or adjusted under 35 U.S.C. 154(b) by 0 days.

(21) Appl. No.: 16/982,451

(22) PCT Filed: May 7, 2018

(86) PCT No.: PCT/US2018/031387
§ 371 (c)(1),
(2) Date: Sep. 18, 2020

(87) PCT Pub. No.: WO2019/190572
PCT Pub. Date: Oct. 3, 2019

(65) Prior Publication Data
US 2021/0054154 A1 Feb. 25, 2021

Related U.S. Application Data

(60) Provisional application No. 62/648,119, filed on Mar. 26, 2018.

(51) Int. Cl.
C08J 3/20 (2006.01)
C08K 3/22 (2006.01)
C08K 3/34 (2006.01)
B29B 7/24 (2006.01)
B29B 7/28 (2006.01)
B29B 7/30 (2006.01)
B29B 7/58 (2006.01)
B29B 7/60 (2006.01)
B29B 7/72 (2006.01)
B29B 13/00 (2006.01)
B29B 17/00 (2006.01)

(52) U.S. Cl.
CPC ............. C08J 3/203 (2013.01); B29B 7/24 (2013.01); B29B 7/242 (2013.01); B29B 7/244 (2013.01); B29B 7/28 (2013.01); B29B 7/283 (2013.01); B29B 7/30 (2013.01); B29B 7/58 (2013.01); B29B 7/60 (2013.01); B29B 7/72 (2013.01); B29B 13/00 (2013.01); B29B 17/0005 (2013.01); C08K 3/22 (2013.01); C08K 3/34 (2013.01); C08J 2367/02 (2013.01); C08K 2003/2241 (2013.01)

(58) Field of Classification Search
CPC .......... C08J 3/203; C08J 2367/02; C08J 3/22; B29B 7/24; B29B 7/242; B29B 7/244; B29B 7/28; B29B 7/283; B29B 7/30; B29B 7/58; B29B 7/60; B29B 7/72; B29B 13/00; B29B 17/0005; C08K 3/22; C08K 3/34; C08K 2003/2241; C08K 2201/005; B32B 2367/00; C08L 2205/025; C08L 67/02; Y02P 20/582
See application file for complete search history.

(56) References Cited

U.S. PATENT DOCUMENTS

| 7,655,291 | B2 | 2/2010 | Ye |
| 7,931,842 | B2 | 4/2011 | Barakat et al. |
| 8,969,433 | B2 | 3/2015 | He et al. |
| 9,550,867 | B2* | 1/2017 | Ohno ................. B01F 27/2722 |
| 9,550,967 | B2 | 1/2017 | Hulse et al. |
| 11,161,960 | B2* | 11/2021 | Joshi ........................ C08J 11/14 |
| 11,434,326 | B2* | 9/2022 | Razeem ................ C08G 63/916 |
| 2003/0022989 | A1* | 1/2003 | Braig ...................... C08L 69/00 |
| | | | 525/67 |
| 2009/0026641 | A1 | 1/2009 | Barakat |
| 2009/0026663 | A1 | 1/2009 | Ellington |
| 2009/0212457 | A1 | 8/2009 | Barakat et al. |
| 2011/0196098 | A1 | 8/2011 | Mettlach et al. |
| 2014/0227506 | A1 | 8/2014 | Kuwabara et al. |
| 2014/0275372 | A1 | 9/2014 | He et al. |
| 2014/0350139 | A1 | 11/2014 | Urushihara et al. |
| 2021/0054154 | A1* | 2/2021 | Razeem ................... C08J 3/203 |

(Continued)

FOREIGN PATENT DOCUMENTS

| AT | 596 527 A1 | 9/2009 |
| CN | 102408686 A | 4/2012 |
| CN | 103810826 A | 6/2017 |

(Continued)

OTHER PUBLICATIONS

International Search Report and Written Opinion issued in Int'l App. No PCT/US18/31387 dated Jul. 23, 2018, 6 pages.
Jiang et al; "Effect of Nucleating Agents on Crystallization Kinetics of PET. eXPRESS Polymer Letters"; Apr. 7, 2007; vol. 1, No. 4; pp. 245-251.
Buntinx et al.; "Evaluation of the Thickness of Oxygen Transmission Rate Before and After Thermoforming Mono-and Multi-layer Sheets into Trays with Variable Depths, Polymers"; Dec. 22, 2014; vol. 6, No. 12; 25 pages.
United States Patent and Trademark Office; International Search Report and Written Opinion issued in Int'l App. No. PCT/US20/30520 dated Jan. 7, 2021; 9 pages.
Campanelli, J.R. et al.; A kinetic study of the hydrolytic degradation of polyethylene terephalate at high temperatures; A Journal of Applied Polymer Science; 1993; vol. 48; Issue 3, pp. 443-451; DOI 10.1002/app.1993.070480309.

(Continued)

Primary Examiner — Charles Cooley
(74) Attorney, Agent, or Firm — Maschoff Brennan

(57) ABSTRACT

A method of forming a polyethylene terephthalate (PET) mixture with talc includes: providing a feed of PET (PET feed); providing a feed of talc (talc feed); mixing the feed of PET with the feed of talc in a mixer at a PET:talc ratio of about 3:1 to about 1:3 to form a PET/talc mixture; and providing the PET/talc mixture as output. A method of forming a Polyethylene Terephthalate (PET) alloy having talc includes: providing a feed of the PET/talc mixture (PET/talc feed); providing a feed of PET (PET feed); mixing the feed of PET with the feed of PET/talc in a mixer to form a PET alloy having from about 1% (w/w) talc to about 50% talc (w/w); and providing the PET alloy as output.

21 Claims, 15 Drawing Sheets

(56) References Cited

U.S. PATENT DOCUMENTS

2021/0163678 A1* 6/2021 Razeem ............... C08G 63/916

FOREIGN PATENT DOCUMENTS

| | | | |
|---|---|---|---|
| CN | 108084424 | | 5/2018 |
| CN | 106810826 | A | 10/2019 |
| JP | 2004168876 | A | 6/2004 |
| JP | 2004526848 | A | 9/2004 |
| JP | 2005165015 | A | 6/2005 |
| JP | 2007100004 | A | 4/2007 |
| JP | 2013049790 | A | 3/2013 |
| JP | 2013129713 | A | 7/2013 |
| JP | 2014051542 | A | 3/2014 |
| JP | 2014159134 | A | 9/2014 |
| JP | 2014201660 | A | 10/2014 |
| JP | 2015048464 | | 3/2015 |
| JP | 2015048465 | A | 3/2015 |
| JP | 2018012836 | A | 1/2018 |
| WO | 2004037656 | A1 | 5/2004 |
| WO | 2009021967 | A1 | 2/2009 |
| WO | 2013031769 | A1 | 3/2013 |
| WO | 2017180629 | | 10/2017 |
| WO | 2019190572 | A1 | 10/2019 |
| WO | 2021113061 | A1 | 6/2021 |

OTHER PUBLICATIONS

Noritake A. et al.; "Recycling of Polyethylene Terephthalate Using High-pressure Steam Treatment"; Polymer Journal; 2008; vol. 40, Issue 6; pp. 498-502; DOI: 10.1295/polymj.pj2007237.
Kelsey D. R. et al.; "Thermal stability of poly(trimethylene terephthalate)"; Polymer; 2005; vol. 46, Issue 21; pp. 8937-8946; DOI: 10.1016/j.polymer.2005.07.015.
McMahon W. et al.; "Degradation Studies of Polyethylene Terephthalate"; Journal of Chemical & Engineering Data; 195;'vol. 4; Issue 1: pp. 57-79; DOI: 10.1021/je60001a009.
Canadian Intellectual Property Office Examiner's Report dated Dec. 2, 2021 issued in CA App. No. 3094063, 4 pages.
Chilean Patent Office First Office Action dated Oct. 15, 2021 issued in CL App. No. 2458-2020, 20 pages.
European Patent Office, Extended European Search Report dated Nov. 23, 2021 issued in EP App No. 18913180.0, 16 pages.
Thomson Scientific et al., London GB; Database WPI—Week 201523, Mar. 16, 2015; AN 2015-18185G.
Thomson Scientific et al., London, GB; Database WPI—Week 201749; Jun. 9, 2017; AN 2017-40340W.
Thomson Scientific et al., London GB; Database WPI—Week 201460; Sep. 4, 2014; AN 2014-Q79420.
Intellectual Property India, Government of India; First Examination Report dated Dec. 20, 2021 issued in IN App. No 202020746453; 6 pages.
Japanese Patent Office; Notice of Refusal dated Dec. 14, 2021, issued in JP App. No. 2020-552305; including machine translation: 46 pages.
Thailand Patent Office; Office Action issued in TH Application No. 2001005328; 3 pages.
Buntinx et al.; "Evaluation of the Thickness and Oxygen Transmission Rate before and after Thermoforming Mono-and Multi-layer Sheets into Trays with Variable Depth"; Polymers Dec. 22, 2014; vol. 6 pp. 3019-3049; doi:10.339/polym6123019; ISSN 2073-4360; 25 pages.
Jiang Xl et al; Effect of Nucleating Agents on Crystallization Kinetic of PET; eXPRESS Polymer Letters; vol. 1, No. 4; Apr. 17, 2007; pp. 245-251; DOI: 10.3144/expresspolymlett.2007.37.
Japanese Patent Office; Decision of Refusal dated May 26, 2022 issued in App No. 2020-552305; 13 pages—including English machine translation.
Brazil Patent and Trademark Office; Preliminary Office Action, dated May 24, 2022, issued in BR App No. 11 2020 019438 7; 7 pages, including English translation.
Canada Intellectual Property Office; Examiner's Report dated May 13, 2022; issued in CA App. No. 3,094,063; 3 pages.
The State Intellectual Property Office of People's Republic of China; The First Office Action issued in CN App No. 201880093687.4 dated Jun. 7, 2022; 14 pages—including English translation.
Brazilian Patent and Trademark Office; Preliminary Office Action in Application No. BR 11 2020 019438 7, dated May 24, 2022.
Canada Intellectual Property Office; Notice of Allowance in Application No. 3,094,063, dated Nov. 15, 2022.
National Institute of Industrial Property (INAPI) Chile; Second Office Action and Search Report in Application No. 202002458; dated Oct. 7, 2022.
China National Intellectual Property Administration; Notice of Granting Right in Invention in Application No. 201880093687.4 dated Oct. 12, 2022.

* cited by examiner

| | Heat Cycle | Tg, °C | Tc, °C | ΔHc, J/g | Tm, °C | ΔHf, J/g |
|---|---|---|---|---|---|---|
| PET | 1st Heat | 73.8 | 130.2 | 30.9 | 251.6 | 38.4 |
| | Cool | --- | 193.6 | 43.9 | --- | --- |
| | 2nd Heat | 81.6 | --- | --- | 252.5 | 39.8 |
| Talc Filled PET Sheet | 1st Heat | 71.5 | 118.0 | 19.2 | 246.8 | 35.1 |
| | Cool | --- | 212.7 | 37.7 | --- | --- |
| | 2nd Heat | 77.9 | --- | --- | 244.9 | 39.3 |
| 110 PET Alloy | 1st Heat | 69.2 | 114.0 | 7.0 | 244.9 | 37.4 |
| | Cool | --- | 211.6 | 39.6 | --- | --- |
| | 2nd Heat | 77.7 | --- | --- | 243.9 | 34.6 |
| 120 PET Alloy | 1st Heat | 72.2 | 114.3 | 5.5 | 246.2 | 37.5 |
| | Cool | --- | 211.5 | 39.8 | --- | --- |
| | 2nd Heat | 79.5 | --- | --- | 244.3 | 36.8 |
| 125 PET Alloy | 1st Heat | 73.0 | 116.4 | 2.1 | 246.5 | 37.2 |
| | Cool | --- | 211.7 | 39.5 | --- | --- |
| | 2nd Heat | 76.2 | --- | --- | 244.2 | 37.8 |
| 105 PET Alloy | 1st Heat | 68.7 | 112.8 | 7.6 | 245.8 | 35.5 |
| | Cool | --- | 211.5 | 38.8 | --- | --- |
| | 2nd Heat | 76.7 | --- | --- | 244.0 | 34.2 |

Fig. 7

| Test Specimen | OTR (CC/(m^2-day)) | cc/100 in² -24hr-atm | % lower Vs. control |
|---|---|---|---|
| Control | 8.67 | 0.558 | - |
| VF2 | 5.64 | 0.363 | 35% |
| VF4 | 3.6 | 0.232 | 58.40% |

VF2 = 10% Talc; VF4 – 20% Talc; Control = GPO1 Sheet

Fig. 8

| | Heat Cycle | Tg °C | Tc1 °C | ΔHc1 J/g | Tm1 °C | Tm2 °C | ΔHf J/g | Tc2 °C | ΔHc2 J/g |
|---|---|---|---|---|---|---|---|---|---|
| PET 20% Talc | 1st Heat | 75.6 | 119.9 | 18.4 | N/A | 246.8 | 33.01 | N/A | N/A |
| | Cool | N/A | N/A | N/A | N/A | N/A | N/A | 210.7 | 33.0 |
| | 2nd Heat | 79.1 | N/A | N/A | N/A | 243.6 | 31.7 | N/A | N/A |
| PET | 1st Heat | N/A | N/A | N/A | 233.2 | 246.9 | 55.5 | N/A | N/A |
| | Cool | N/A | N/A | N/A | N/A | N/A | N/A | 160.8 | 21.5 |
| | 2nd Heat | 80.9 | 165.9 | 10.1 | N/A | 245.2 | 33.1 | N/A | N/A |
| PET Alloy | 1st Heat | N/A | 114.8 | 1.8 | 232.3 | 246.3 | 40.3 | N/A | N/A |
| | Cool | N/A | N/A | N/A | N/A | N/A | N/A | 196.6 | 33.6 |
| | 2nd Heat | 79.5 | N/A | N/A | N/A | 244.1 | 27.5 | N/A | N/A |

Fig. 9

| | Injection | Molar Mass Averages (g/mol) | | | |
|---|---|---|---|---|---|
| | | Mn | Mw | Mz | Mw/Mn |
| PET Alloy | 1 | 28,200 | 75,400 | 139,000 | 2.67 |
| | 2 | 28,100 | 75,800 | 141,000 | 2.70 |
| | Average | 28,100 | 75,600 | 140,000 | 2.69 |
| | Std. Dev. | 110 | 330 | 1,500 | 0.02 |
| PET 20% Talc | 1 | 23,400 | 48,100 | 76,000 | 2.06 |
| | 2 | 23,400 | 47,700 | 74,300 | 2.04 |
| | Average | 23,400 | 47,900 | 75,100 | 2.05 |
| | Std. Dev. | 10 | 270 | 1,180 | 0.01 |

Fig. 10

PET Alloy

| Specification | Values | Units | Standard used |
|---|---|---|---|
| MFR | 31 | g/10" | ASTM D 1238 |
| Flex Modulus | 715 | Kpsi | ASTM D 790 |
| % strain at break | 3.83 | % | ASTM D638 |
| Flexural Strength | 15000 | Psi | ASTM D 790 |
| Notched Izod | 0.79 | Ft-lb/in | ASTM D 256 |

GPPS RESIN

| Specification | Values | Units | Standard used |
|---|---|---|---|
| MFR | 27 | g/10" | ASTM D 1238 |
| Flex Modulus | 450 | Kpsi | ASTM D 790 |
| % strain at break | 5 | % | ASTM D638 |
| Flexural Strength | 10151 | Psi | ASTM D 790 |
| Notched Izod | 0.4 | Ft-lb/in | ASTM D 256 |

| PET | 100 | 99 | 96 | 96 | 85 | 84 | 83 | 82 | 81 | 81 |
|---|---|---|---|---|---|---|---|---|---|---|
| H05C, talc Dried at 250 F 16 hours | 0 | 0 | 0 | 0 | 15 | 15 | 15 | 15 | 15 | 15 |
| CGF | 0 | 1 | 4 | 4 | 0 | 1 | 2 | 3 | 4 | 4 |
| HDT (64 psi, n=5, 1/8" bar, 2C/min), C | 66 | 69.5 | 73.5 | 76 | 86 | 89 | 92.6 | 94 | 96 | 87 |
| Flexural Modulus, Kpsi | 328 | 405 | 400 | 565 | 604 | 631 | 635 | 654 | 706 |
| Flexural Modulus, Tangent, Kpsi | 333 | 408 | 400 | 589 | 646 | 668 | 685 | 699 | 718 |
| Maximum Strain, % | 5 | 5 | 5 | 3.1 | 2.68 | 2.67 | 2.47 | 2.6 | 2.19 |
| Flexural Strength, psi | 10645 | 12950 | 12980 | 13734 | 13294 | 13496 | 13424 | 14113 | 13636 |

Fig. 12

POLYETHYLENE TEREPHTHALATE ALLOY HAVING TALC

CROSS-REFERENCE

The present application claims priority to U.S. Provisional Application No. 62/648,119 filed Mar. 26, 2018, which provisional application is incorporated herein by specific reference in its entirety.

BACKGROUND

Polyethylene Terephthalate (PET) is a crystallizable polymer, which crystallization influences many properties, such as clarity, stiffness and strength of the PET product. The high molecular weight of commercial PET leads to poor flow properties, which precludes the manufacture of thin-walled injection molded parts with PET. PET has a slow crystallization, which leads to long cycle times that are not commercially viable. Furthermore, PET has a low heat distortion temperature (HDT), such that the PET article can soften at relatively low temperatures.

A PET polymer having better flow, faster crystallization, and higher HDT while maintaining the good properties of PET is desirable.

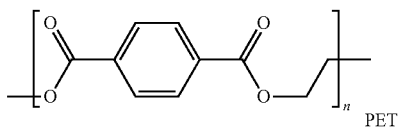
PET

SUMMARY

In one embodiment, a method of forming a polyalkylene terephthalate (PAT) (e.g., Polyethylene Terephthalate (PET)) mixture with talc is provided. The method can include: providing a feed of PAT (PAT feed); providing a feed of talc (talc feed); mixing the feed of PAT with the feed of Talc in a mixer at a PAT:talc ratio of about 3:1 to about 1:3 to form a PAT/talc mixture; and providing the PAT/talc mixture as output.

In one embodiment, a system for forming a Polyalkylene Terephthalate (PAT) mixture with talc is provided. The system can include: a feed of PAT (PAT feed); a feed of talc (talc feed); and a mixer coupled to an outlet of the PAT feed and coupled to an outlet of the talc feed, wherein the mixer is capable of mixing PAT with Talc at a PAT:talc ratio of about 3:1 to about 1:3 to form a PAT/talc mixture.

In one embodiment, a method of forming a Polyalkylene Terephthalate (PAT) alloy having talc is provided. The method can include: providing a feed of PAT (PAT feed); providing a feed of PAT/talc (PAT/talc feed); mixing the feed of PAT with the feed of PAT/talc in a mixer to form a PAT alloy having from about 1% (w/w) talc to about 50% talc (w/w); and providing the PAT alloy as output.

In one embodiment, a system for forming a Polyalkylene Terephthalate (PAT) alloy having talc is provided. The system can include: a feed of PAT (PAT feed); a feed of PAT/talc (talc feed); a mixer coupled to an outlet of the PAT feed and coupled to an outlet of the PAT/talc feed, wherein the mixer is capable of mixing PAT with PAT/talc to form a PAT alloy having from about 1% (w/w) talc to about 50% talc (w/w).

In one embodiment, a polyalkylene terephthalate/talc (PAT/talc) mixture can include: polyalkylene terephthalate (PAT) containing talc at a PAT:talc ratio of about 3:1 to about 1:3.

In one embodiment, a polyalkylene terephthalate (PAT) alloy can include PAT having talc. The PAT can include: a first portion of PAT polymers having a first average molecular weight; a second portion of PAT polymers having a second average molecular weight, wherein the first average molecular weight is less than the second average molecular weight. The talc is in the PAT, wherein the talc is present in an amount of at least 1% and less than 50%.

In one embodiment, a mold system can include: a mold having a mold cavity; and a PAT alloy having PAT comprising a first portion of PAT polymers having a first average molecular weight and a second portion of PAT polymers having a second average molecular weight, wherein the first average molecular weight is less than the second average molecular weight, and talc in the PAT, wherein the talc is present in an amount of at least 1% and less than 50%, wherein the PAT alloy completely fills the mold cavity of the mold. The PAT can be:

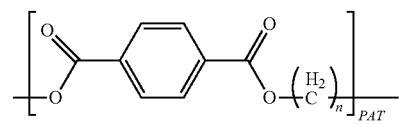

In the PAT, n may be any reasonable integer, such as 1 (Polymethylene Terephthalate (PMT)), 2 (Polyethylene Terephthalate (PET)), 3 Polypropylene Terephthalate (PPT), 4 (Polybutylene Terephthalate (PBT)), or 5 Polypentylene Terephthalate (PPentT), or the like (e.g., n is 6, 7, 8, 9, 10, etc.).

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 includes a table showing properties of the PET alloy obtained by DSC.

FIG. 8 includes a table showing oxygen permeability of the PET alloy.

FIG. 9 includes a table showing properties of the PET alloy obtained by DSC.

FIG. 10 includes a table showing the molar mass averages molecular weights for PET alloy and PET/talc.

FIG. 12 includes a table showing mechanical properties of the PET alloy further having chopped glass fiber (CGF).

DETAILED DESCRIPTION

Figure 1:
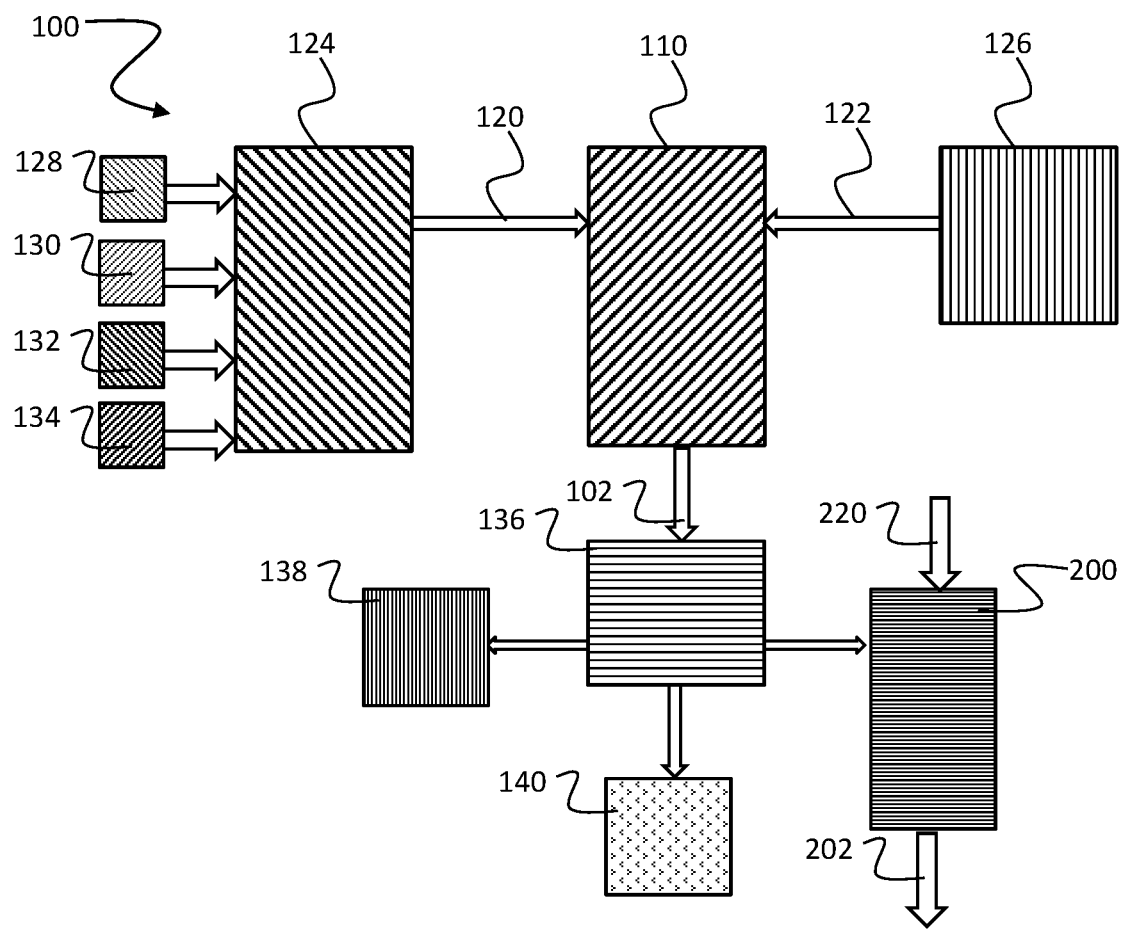
FIG. 1 is a schematic representation of a system for preparing a PET/talc mixture.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present technology includes a system and method for preparing a Polyethylene Terephthalate (PET) alloy that includes talc. The PET alloy is formed with a system that prepares a PET/talc mixture, and then combines the PET/talc mixture with a PET composition to produce the PET alloy. Accordingly, the system and method can be used to produce a talc-filled PET (e.g., PET/talc mixture) that is manufactured in a precise manner, and which PET/talc mixture is then blended with PET (e.g., fresh PET, virgin PET, or PET without talc, etc.) to form a PET alloy material that has better flow characteristics, rapid crystallization, higher HDT and better barrier properties that PET, while maintaining the other desirable properties of PET, such as tensile strength and flexural yield strength.

PET can be favorable in products because of the water repellent and moisture barrier properties, which allows for PET alloy articles to be containers for liquid storage, such as for beverages (e.g., soft drinks, water, beer, etc.). The high mechanical strength of the PET alloy can allow for use in tapes, such as a carrier for magnetic tape or a backing for pressure-sensitive adhesive tapes, or the like.

Now, the PET alloy can be modulated with the processing and amount of talc in the PET/talc mixture as well as the PET alloy to modulate the crystallization process, which allows for modulating clarity, stiffness and strength of the PET alloy product. The PET alloy can include low molecular weight PET mixed with talc and high molecular weight PET can leads to a faster or otherwise improved flow, and thereby now the PET alloy can be used in injection molding, such as for the manufacture of thin-walled injection molded parts, as well as extrusion to form a variety of extrudates, such as tales and fibers, and cylinders for pelletizing with a chopper. The PET alloy has a significantly shorter cycle time for crystallization, which allows for improved methods and uses for PET by using the PET alloy. Additionally, the PET alloy has a higher heat distortion temperature (HDT), which now allows the PET alloy to soften at significantly higher temperature compared to prior PET (e.g., non-alloy). Thus, the PET alloy provides a polymer having better flow, faster crystallization, and higher HDT. The improved systems and methods can now be used to produce a talc-filled PET (e.g., PET/talc mixture) manufactured in a precise manner, which PET/talc mixture is then blended with virgin PET (e.g., without talc) to form a PET alloy material which has better barrier properties, such as reduced oxygen permeability (see data in FIG. 8). The data shows the PET alloy is a more effective barrier to gas permeability compared to standard unmodified PET. The data is expected to also show reduced permeability for carbon dioxide, water vapor and other gases. The improved barrier stems from increased crystallinity and the presence of talc, a platy, impermeable solid. These two changes reduce permeability to all types of penetrants.

The PET alloy may be formed into an amorphous (transparent) article, or a semi-crystalline article. The semi-crystalline material can appear transparent (e.g., when having particle size less than 500 nm) or opaque and white (e.g., when having particle size up to a few micrometers) depending on its crystal structure and particle size.

In one example, the PET feed material can be prepared by any suitable process. As generally known, the monomer bis(2-hydroxyethyl) terephthalate can be synthesized by the esterification reaction between terephthalic acid and ethylene glycol with water as a byproduct, or by transesterification reaction between ethylene glycol and dimethyl terephthalate (DMT) with methanol as a byproduct. Polymerization is through a polycondensation reaction of the monomers (e.g., done immediately after esterification/transesterification) with water as the byproduct. The PET feed material can be prepared as described in U.S. 2009/0212457, which is incorporated herein by specific reference in its entirety. The PET feed material may be a sheet, pellet or other form as well as liquid PET. The PET feed material can be processed so that it is a liquid and flowable state for the methodologies described herein.

In one embodiment, a method of forming a polyethylene terephthalate (PET) mixture with talc is provided. Such a method can be performed with a PET/talc system 100, such as shown in FIG. 1. The PET/talc system 100 for forming a PET mixture with talc can include: a feed of PET 120 (PET feed); a feed of talc 122 (talc feed); and a mixer 110 coupled to an outlet of the PET feed 120 and coupled to an outlet of the talc feed 122. The mixer 110 is capable of mixing PET with talc at a PET:talc ratio of about 3:1 to about 1:3 to form a PET/talc mixture or other ratio as desired. The system 100 can also include an output 136 operably coupled to an outlet of the mixer 110. The output 136 is selected from a container, pump, flow line, heater, cooler, extruder, die, pelletizer, mixer, and combinations thereof as well as other art-known components for PET systems. As shown, the system 100 can include the PET feed 120 having an inlet coupled to a PET supply 124.

It should be recognized that the PET may be substituted by PAT or any other type of PAT in the method and system 100. That is, the system may be configured for use with any PAT, and thereby the recitations of PET may also refer to PAT herein and for the other methods and other systems provided herein. For example, the PET/tac system 100 may be a PAT/talc system 100, and so on.

The system 100 may also include the talc feed 122 having an inlet coupled to a talc supply 126. The system 100 can include one or more of: a PET reactor system 128; a PET recycling system 130; a PET conditioning system 132; or a PET reservoir 134. The PET reactor system 128 is configured to polymerize the PET from PET precursor reagents. The PET recycling system 130 is configured to recycle the PET from PET articles. The PET conditioning system 132 is configured to condition the PET for mixing with talc, the conditioning selected from one or more of heating, chopping PET pellets or sheets or other PET member, agitating, extruding, drying; off-gassing, or the like. The PET reservoir 134 includes liquid PET, wherein the liquid PET is melted PET.

The system 100 can include the talc supply 126 having talc powder in a flowable format. The flowable format may include talc particles, such as in a talc powder format. The talc powder includes talc particles from about 0.25 microns to about 100 microns, or about 0.5 microns to about 75 microns, or about 0.75 microns to about 0.5 microns, or about 1 microns to about 40 microns, or about 5 microns to about 30 microns, or about 10 microns to about 25 microns, or about 15 microns to about 20 microns.

The system 100 includes the mixer 110, which can be any mixer capable of mixing liquid PET and talc in batch or continuous formats, such as a single screw mixer, double-screw mixer, continuous kneader (e.g., B&P Littleford continuous kneader; Buss Kneeder), reciprocating screw mixer (e.g., B&P Littleford TriVolution), twin-screw extruder (B&P Littleford), continuous plow mixer (e.g., B&P Littleford). In one aspect, the mixer 110 also performs one or more of: degassing, homogenizing, dispersing, or heating.

The system 100 can include a PET/talc mixture storage 138. The PET/talc mixture storage can be in any format and the PET/talc may be included therein in any format. However, the PET/talc can be pelletized prior to entering the storage or formed into any other storable format (e.g., molten liquid).

The system 100 can include an analytical system 140. The analytical system 140 includes one or more analytical systems capable of various analytical processes. For example, the analytical system 140 can be configured for determining intrinsic viscosity of melted PET/talc mixture output 102. In another example, the analytical system 140 can be configure for determining flow rate of melted PET/talc mixture output 102. In another example, the analytical system 140 can be configure for determining melting point of PET/talc mixture output 102. In another example, the analytical system 140 can be configure for determining crystallization temperature of PET/talc mixture output 102. In another example, the analytical system 140 can be configure for determining a differential scanning calorimetry profile of PET/talc mixture output 102. In another example, the analytical system 140 can be configure for determining heat distortion temperature of PET/talc mixture output 102.

In accordance with the system 100 for forming the PET/talc mixture, a method can be performed for forming the PET/talc mixture. Such a method can include: providing a feed of PET 120 (PET feed); providing a feed of talc 122 (talc feed); mixing the feed of PET with the feed of Talc in a mixer 110 at a PET:talc ratio of about 3:1 to about 1:3 to form a PET/talc mixture; and providing the PET/talc mixture as output 102. In one aspect, the PET feed 120 is from a PET supply 124. In one aspect, the talc feed 122 is from a talc supply 126.

In one embodiment, the PET supply 124 receives the PET feed from one or more of: a PET reactor system 128; a PET recycling system 130; a PET conditioning system 132; or a PET reservoir 134. The PET reactor system 128 polymerizes the PET from PET precursor reagents. The PET recycling system 130 recycles the PET from PET articles. The PET conditioning system 132 conditions the PET for mixing with talc, the conditioning selected from one or more of heating, chopping PET pellets or sheets or other PET member, agitating, extruding, drying; off-gassing. The PET reservoir 134 of liquid PET, wherein the liquid PET is melted PET.

In one embodiment, the talc supply 126 includes talc powder in a flowable format. This can include providing the talc as powder, which can include talc particles from about 0.25 microns to about 100 microns, or about 0.5 microns to about 75 microns, or about 0.75 microns to about 0.5 microns, or about 1 microns to about 40 microns, or about 5 microns to about 30 microns, or about 10 microns to about 25 microns, or about 15 microns to about 20 microns.

In one embodiment, the method can include preparing the talc to have the talc particles, the preparing including mining, crushing, grinding, or other processing to form the talc particles. Optionally, the system 100 may include equipment for preparing the talc, such as mining equipment, crushers, grinders, or the like.

The mixing can be performed by the mixer 110, which can be any mixer capable of mixing liquid PET and talc in batch or continuous formats, such as a single screw mixer, double-screw mixer, continuous kneader (e.g., B&P Littleford continuous kneader; Buss Kneeder), reciprocating screw mixer (e.g., B&P Littleford TriVolution), twin-screw extruder (B&P Littleford), or continuous plow mixer (e.g., B&P Littleford), or other mixer that is capable of mixing the PET and talc. Optionally, the mixer 110 also performs one or more of: degassing, homogenizing, dispersing, or heating.

The method can also include providing the PET/talc mixture output 102 to an output system 136. The output system 136 provides the PET/talc mixture to storage 138 (e.g., in pellets) or a PET alloy system 200 or an analytical system 140. The method may include pelletizing the PET/talc mixture output 102 with a pelletizer. The analytical system 140 includes one or more analytical systems capable of: determining intrinsic viscosity of melted PET/talc mixture output 102; determining flow rate of melted PET/talc mixture output 102; determining melting point of PET/talc mixture output 102; determining crystallization temperature of PET/talc mixture output 102; determining a differential scanning calorimetry profile of PET/talc mixture output 102; or determining heat distortion temperature of PET/talc mixture output 102.

The PET alloy system 200 is described in detail below. However, in one aspect, the PET alloy system 200 is configured to combine the PET/talc mixture output 102 with a second feed of PET 220 (second PET feed) to produce a PET alloy 202.

In one aspect, the PET feed 120 is devoid of another polymer. In another aspect, the talc feed 122 is devoid of another polymer. However, the PET feed 120 and/or talc feed may include other polymers, such as a PAT as defined herein or a polycarbonate. In one aspect, the PET feed 120 consists essentially (or consists of) of PET. In one aspect, the talc feed 122 consists essentially (or consists of) talc (optionally with trace water). In one aspect, the PET feed 120 includes melted PET.

In one embodiment, the PET feed 120 includes water at an amount less than 5%, or less than 1%, or less than 0.1%, or a trace amount of water or is devoid of water. Accordingly, the method can include drying the PET feed 120 before mixing with the talc feed 122. Also, the method can include drying the talc feed 122 before mixing with the PET feed 120.

In one embodiment, the method can include preparing the PET. As such, the method may include polymerizing the PET from polymerizable reagents.

The method can include providing PET/talc mixture output 102 having a PET:talc ratio of about 2:1 to about 1:2 or about 1:1. Alternatively, the provided PET/talc mixture output 102 has a PET concentration of about 20% to about 80%, about 25% to about 75%, about 40% to about 60%, or about 50%. In another alternative, the provided PET/talc mixture output 102 has a talc concentration of about 20% to about 80%, about 25% to about 75%, about 40% to about 60%, or about 50%.

In one embodiment, the provided PET/talc mixture output 102 has an intrinsic viscosity of from about 0.25 to about 0.7, or about 0.3 to about 0.65, or about 0.35 to about 0.6, or about 0.4 to about 0.5.

Figure 2:
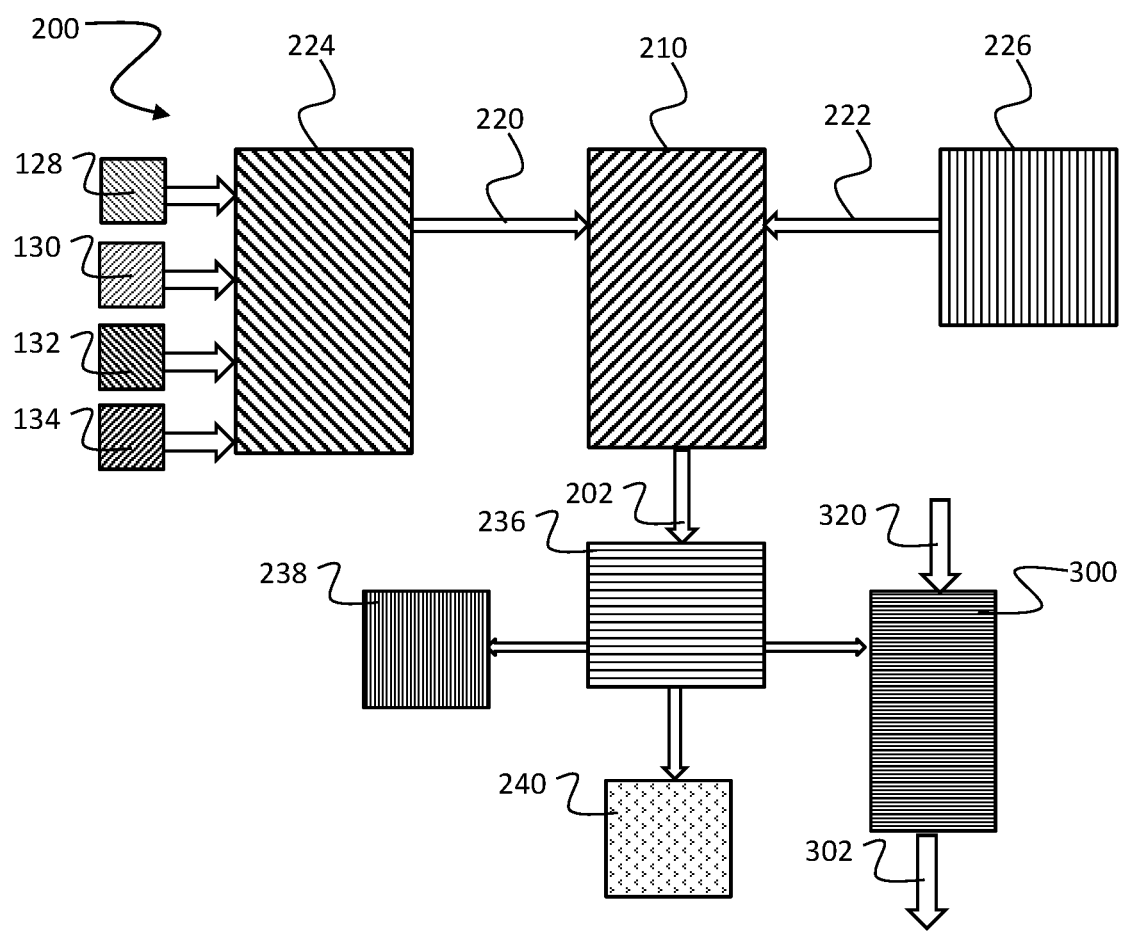
FIG. 2 is a schematic representation of a system for preparing a PET alloy having talc.

A method of forming a Polyethylene Terephthalate (PET) alloy having talc can be performed with the system 200 of FIG. 2. A system 200 for forming a Polyethylene Terephthalate (PET) alloy talc can include a feed of PET 220 (PET feed), which can include any type of PET, such as virgin PET, recycled PET, or other source of PET (e.g., with or without other polymers, additives, etc.). The system 200 can also include a feed of PET/talc 222 (talc feed), which can be the PET/talc mixture output 102 obtained from the method used with the system 100 of FIG. 1. The system 200 can include a mixer 210 coupled to an outlet of the PET feed 220 and coupled to an outlet of the PET/talc feed 222, wherein the mixer 210 is capable of mixing PET with PET/talc to form a PET alloy having from about 1% (w/w) talc to about 50% talc (w/w). The system 200 can include an output 136 operably coupled to an outlet of the mixer 110, wherein the output is selected from a container, pump, flow line, heater, cooler, extruder, die, pelletizer, and combinations thereof.

In one embodiment, the system 200 can include the PET feed 220 having an inlet coupled to a PET supply 224. The PET supply 224 can be of the same type as the PET supply 124 of the system 100 of FIG. 1. The system 200 can include a PET reactor system 128 that that is configured for polymerizing the PET from PET precursor reagents. The system 200 can include a PET recycling system 130 that is configured for recycling the PET from PET articles. The system 200 can include a PET conditioning system 132 that is configured for conditioning the PET for mixing with PET/talc, the conditioning selected from one or more of heating, chopping PET pellets or sheets or other PET member, agitating, extruding, drying; off-gassing, or other conditioning. The system 200 can include a PET reservoir 134 of solid PET pellets or liquid PET, wherein the liquid PET is melted PET. A heating system may also be included to heat the PET to the appropriate temperature and to liquefy the solid PET pellets, where such a heating system can be included in any system component or flow line.

In one embodiment, the system 200 can include the PET/talc feed 122 having an inlet coupled to a PET/talc supply 226. The PET/talc supply 226 can include the PET/talc mixture output 202, and may be a solid pellet form or a molten liquid form. In one aspect, the PET/talc supply 226 includes the PET/talc in a flowable format and/or includes a heater to heat the PET/talc into a flowable format (e.g., molten PET/talc liquid). In one aspect, the PET/talc includes talc particles from about 0.25 microns to about 100 microns, or about 0.5 microns to about 75 microns, or about 0.75 microns to about 0.5 microns, or about 1 microns to about 40 microns, or about 5 microns to about 30 microns, or about 10 microns to about 25 microns, or about 15 microns to about 20 microns.

In one embodiment, the mixer 210 is any mixer capable of mixing liquid PET and PET/talc in batch or continuous formats, such as a single screw mixer, double-screw mixer, continuous kneader (e.g., B&P Littleford continuous kneader; Buss Kneeder), reciprocating screw mixer (e.g., B&P Littleford TriVolution), twin-screw extruder (B&P Littleford), continuous plow mixer (e.g., B&P Littleford), or other. The mixer 210 is configured to perform one or more of: degassing, homogenizing, dispersing, or heating. In one embodiment, the system 200 can include storage 238. The storage 238 may include the PET alloy in any format, such a heated liquid or a solid (e.g., pelletized solid). The system 200 can include an analytical system 240. The analytical system 240 includes one or more analytical systems capable of various analytical processes. For example, the analytical system 240 can be configured for determining intrinsic viscosity of melted PET alloy output 202. In another example, the analytical system 240 can be configured for determining flow rate of melted PET alloy output 202. In another example, the analytical system 240 can be configure for determining melting point of PET alloy output 202. In another example, the analytical system 240 can be configured for determining crystallization temperature of PET alloy output 202. In another example, the analytical system 240 can be configured for determining a differential scanning calorimetry profile of PET alloy output 202. In another example, the analytical system 240 can be configure for determining heat distortion temperature of PET alloy output 202.

Figure 3:
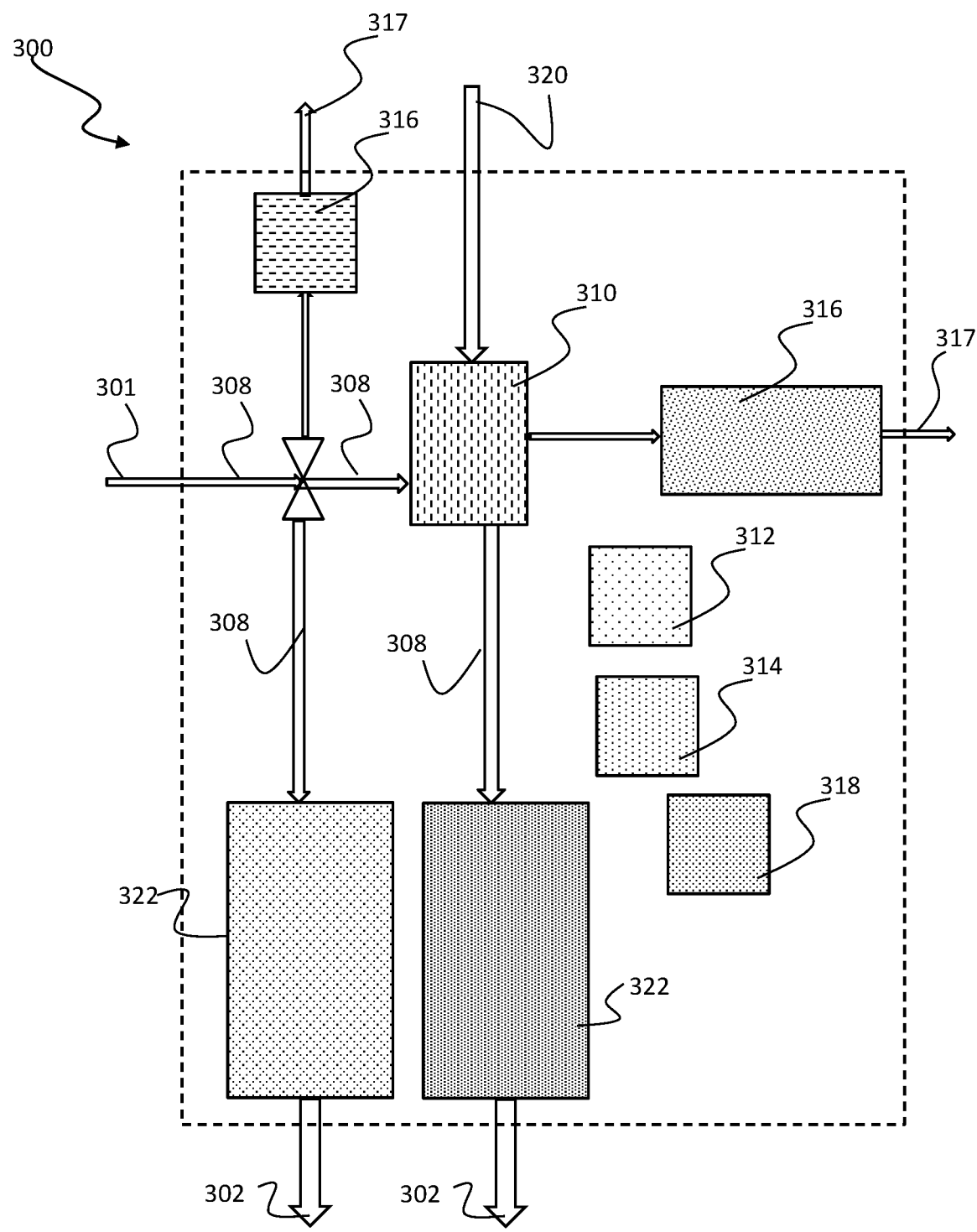
FIG. 3 is a schematic representation of a system for preparing a PET alloy into different articles, and optionally with additional optional components.

In one embodiment, the system 200 can include a manufacturing system 300 that is configured to convert the PET alloy output 202 into an article of manufacture 302. The manufacturing system 300 can include an optional component input feed 320. The optional component input feed 320 can be configured to provide an optional component to the PET alloy. The optional component can be selected from a filler, TiO$_2$, second polymer, glass pellets, glass fibers, glass particles, sodium ionomers, sodium stearate, nucleating agent, polycarbonate, polybutylene terephthalate (PBT) or other polyalkylene terephthalate (PAT), or other component of a PET article of manufacture 302. As shown in FIG. 3, the manufacturing system 300 can include one or more of: a PET alloy feed 301; one or more flow channels 308 containing flowable PET alloy; a mixer 310; a heating system 312; an extruder system 316 that produces PET alloy extrudate 317; a pumping system 318 an injection molding system 322; and/or a cooling system 314.

In one aspect, the optional component can be provided into the mixer 110 to be mixed into the PET/talc mixture output 102, or provided into the mixer 210 to be mixed into the PET alloy output 202. Alternatively, the provided PET 220 may include the optional component or the provided PET/talc 222 may be prepared to include the optional component. Thus, the optional component can be introduced into the PET at any stage in the processing described herein.

The system 200 can have various modifications, such as those described herein. In one aspect, the PET feed 220 is devoid of another polymer. In one aspect, the PET/talc feed 222 is devoid of another polymer. In one aspect, the PET feed 220 consists essentially (or consists of) of PET. In one aspect, the PET/talc feed 222 consists essentially (or consists of) PET and talc (optionally with trace water). In one aspect, the PET feed 220 includes melted PET. In one aspect, the PET feed 220 includes water at an amount less than 5%, or less than 1%, or less than 0.1%, or a trace amount of water or is devoid of water.

In one embodiment, the system 200 can include a dryer for drying the PET feed 220 before mixing with the PET/talc feed 222. In one embodiment, the system 200 can include a dryer for drying the PET/talc feed 222 before mixing with the PET feed 220. Such a dryer can be included in any location in the system 200 or any suitable component may be outfitted with a dryer. The dryer can facilitate water removal in order to enhance processing and preparation of the PET alloy having talc.

In one embodiment, the system 200 can include the provided PET/talc feed 222 having a PET:talc ratio of about 3:1 to about 1:3, or about 2:1 to about 1:2 or about 1:1. In one aspect, the provided PET alloy output 202 has a PET concentration of about 50% to about 99%, about 25% to about 75%, about 40% to about 60%, or about 50%. In one aspect, the provided PET alloy output 202 has a talc concentration of about 2% to about 40%, about 5% to about 30%, about 10% to about 25%, or about 20%.

In one embodiment, the provided PET feed 220 of the system 200 has an intrinsic viscosity of 0.55 or more, such as from about 0.6 to about 0.9, or about 0.625 to about 0.8, or about 0.65 to about 0.7. In one aspect, the provided PET alloy output 102 has an intrinsic viscosity of from about 0.5 to about 0.9, or about 0.6 to about 0.8, or about 0.625 to about 0.7, or about 0.65 to about 0.675.

In one embodiment, a method of forming a Polyethylene Terephthalate (PET) alloy having talc can be performed with the system 200 as described herein. The method of forming the PET alloy having talc can include: providing a feed of PET 220 (PET feed); providing a feed of PET/talc 222 (PET/talc feed); mixing the feed of PET 220 with the feed of PET/talc 222 in a mixer 210 to form a PET alloy having from about 1% (w/w) talc to about 50% talc (w/w); and providing the PET alloy as output 202. In one aspect, the PET feed 220 is from a PET supply 224, such as described herein. In one aspect, the PET/talc feed 122 is from a PET/talc supply 226, such as described herein.

In one embodiment, the method can include the PET supply 224 receiving the PET feed from one or more of: a PET reactor system 128; a PET recycling system 130; a PET conditioning system 132; or a PET reservoir 134. The PET reactor system 128 can polymerize the PET from PET precursor reagents. The PET recycling system 130 can recycle the PET from PET articles. The PET conditioning system 132 can condition the PET for mixing with PET/talc, the conditioning selected from one or more of heating, chopping PET pellets or sheets or other PET member, agitating, extruding, drying; off-gassing. The PET reservoir 134 can retain the PET in a solid state (e.g., pellets) or as liquid PET, wherein the liquid PET is melted PET.

In one embodiment, the method can include obtaining talc. The talc can be obtained as particles or formed into particles by milling. The talc particles can be from about 0.25 microns to about 100 microns, or about 0.5 microns to about 75 microns, or about 0.75 microns to about 0.5 microns, or about 1 microns to about 40 microns, or about 5 microns to about 30 microns, or about 10 microns to about 25 microns, or about 15 microns to about 20 microns.

In one embodiment, the method includes the mixer 210 mixing the PET and talc into the PET alloy having talc. Such mixing can be by any mixer capable of mixing liquid PET and talc in batch or continuous formats, such as a single screw mixer, double-screw mixer, continuous kneader (e.g., B&P Littleford continuous kneader; Buss Kneeder), reciprocating screw mixer (e.g., B&P Littleford TriVolution), twin-screw extruder (B&P Littleford), continuous plow mixer (e.g., B&P Littleford), or the like. In one aspect, the mixer 210 also performs one or more of: degassing, homogenizing, dispersing, or heating. In one embodiment, the PET alloy output 202 is provided to an output system 236. The output system 236 provides the PET alloy to storage 238 or an analytical system 240 or a manufacturing system 300. The storage 238 may be adapted to retain the PET alloy as a liquid, such as by including heaters, or as pellets, whereby the output system 236 may include a pelletizer to pelletize the PET alloy. In one aspect, the analytical system 240 includes one or more analytical systems capable of performing one or more of the following analytical methods on the PET alloy: determining intrinsic viscosity of melted PET alloy output 202; determining flow rate of melted PET alloy output 202; determining melting point of PET alloy output 202; determining crystallization temperature of PET alloy output 202; determining a differential scanning calorimetry profile of PET alloy output 202; or determining heat distortion temperature of PET alloy output 202. In one aspect, the manufacturing system 300 is operated to convert the PET alloy output 202 into an article of manufacture. In one aspect, the article of manufacture can be a PET alloy pellet. In one aspect, the article of manufacture can include other components, which can be introduced into the PET alloy in the system 300 or other system as described herein. The manufacturing system 300 is described in more detail herein.

In one embodiment, the method includes providing the PET feed 220 that is devoid of another polymer. In one aspect, the method can include providing the PET/talc feed 222 that is devoid of another polymer. In one aspect, the method can include providing the PET feed 220 that consists essentially (or consists of) of PET. In another aspect, the method can include providing the PET/talc feed 222 that consists essentially (or consists of) PET and talc (optionally with trace water). In one aspect, the method includes providing the PET feed 220 as melted PET. In one aspect, the method includes providing the PET feed 220 that includes water at an amount less than 5%, or less than 1%, or less than 0.1%, or a trace amount of water or is devoid of water.

In one embodiment, the method can include drying the PET feed 220 before mixing with the PET/talc feed 222. In one aspect, the method can include drying the PET/talc feed 222 before mixing with the PET feed 220.

In one embodiment, the method can include polymerizing the PET from polymerizable reagents.

In one embodiment, the method can include providing the PET/talc feed 222 with a PET:talc ratio of about 3:1 to about 1:3, or about 2:1 to about 1:2 or about 1:1. In one aspect, the method can include providing the PET alloy output 202 with a PET concentration of about 60% to about 99%, about 70% to about 95%, about 75% to about 90%, or about 80%. In one aspect, the method can include providing the PET alloy output 202 with a talc concentration of about 1% to about 40%, about 5% to about 30%, about 10% to about 25%, or about 20%.

In one embodiment, the method can include providing the PET feed 220 with an intrinsic viscosity of 0.55 or more, such as from about 0.6 to about 0.9, or about 0.625 to about 0.8, or about 0.65 to about 0.7. In one aspect, the method can include forming the PET alloy output 102 with an intrinsic viscosity of from about 0.5 to about 0.9, or about 0.6 to about 0.8, or about 0.625 to about 0.7, or about 0.65 to about 0.675.

In one embodiment, the system 200 can include a manufacturing system 300 that is configured to convert the PET alloy output 202 into an article of manufacture 302. The manufacturing system 300 can include an optional component input feed 320. The optional component input feed 320 can be configured to provide an optional component to the PET alloy. The optional component can be selected from a filler, $TiO_2$, second polymer, glass pellets, glass fibers, glass particles, sodium ionomers, sodium stearate, nucleating agent, polycarbonate, polybutylene terephthalate (PBT) or other polyalkylene terephthalate (PAT), or other component of a PET article of manufacture 302.

As shown in FIG. 3, the manufacturing system 300 can include one or more of: a PET alloy feed 301; one or more flow channels 308 containing flowable PET alloy; a mixer 310; a heating system 312 capable of heating any component of the system 300; an extruder system 316 that produces PET alloy extrudate 317 (e.g., which may also include a pelletizer to pelletize the PET alloy extrudate 317; a pumping system 318 that can pump the PET alloy to any component in the system 300; an injection molding system 322; and/or a cooling system 314 that can cool any component in the system.

As described herein, the systems 100 and corresponding method can prepare a polyethylene terephthalate/talc (PET/talc) mixture that includes PET and talc. The PET/talc can have various amounts of the talc in the PET. As such, the PET:talc can have a suitable ratio for using the PET/talc to form the PET alloy having talc. The PET/talc can include a PET:talc ratio of about 3:1 to about 1:3; however, other ratios are possible.

The PET/talc can include talc particles. The talc particles can from about 0.25 microns to about 100 microns, or about 0.5 microns to about 75 microns, or about 0.75 microns to about 0.5 microns, or about 1 microns to about 40 microns, or about 5 microns to about 30 microns, or about 10 microns to about 25 microns, or about 15 microns to about 20 microns. In one aspect, the PET/talc mixture has a PET:talc ratio of about 2:1 to about 1:2 or about 1:1. In one aspect, the PET/talc mixture has a PET concentration of about 20% to about 80%, about 25% to about 75%, about 40% to about 60%, or about 50%. In one aspect, the PET/talc mixture has a talc concentration of about 20% to about 80%, about 25% to about 75%, about 40% to about 60%, or about 50%.

In one embodiment, the PET/talc mixture includes water at an amount less than 5%, or less than 1%, or less than 0.1%, or a trace amount of water or is devoid of water. Accordingly, the PET and/or talc feeds that form the PET/talc can be devoid of water or include significantly small amounts of water.

In one aspect, the PET/talc mixture has an intrinsic viscosity of from about 0.25 to about 0.7, or about 0.3 to about 0.65, or about 0.35 to about 0.6, or about 0.4 to about 0.5.

As described herein, the systems 200 and corresponding method can prepare a polyethylene terephthalate alloy having talc. The PET alloy can have various amounts of the talc in the PET. As such, the PET:talc can have a suitable ratio PET alloy to form various articles of manufacture, such as injection molding. Such a PET alloy can include PET and talc. The PET of the PET alloy includes: a first portion of PET polymers having a first average molecular weight; and a second portion of PET polymers having a second average molecular weight. The first average molecular weight is less than the second average molecular weight. The talc is present in the PET in an amount of at least 1% and less than 50%.

Figure 5A:
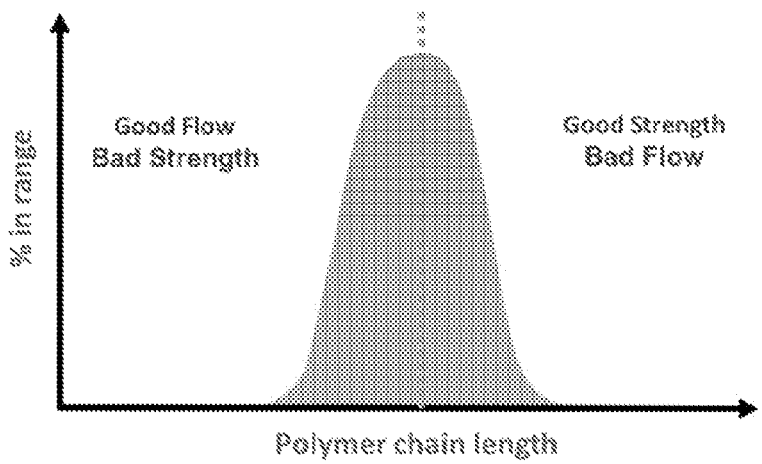
FIGS. 5A-5C show the relationship of flow and strength versus the PET polymer chain length.
Figure 5B:
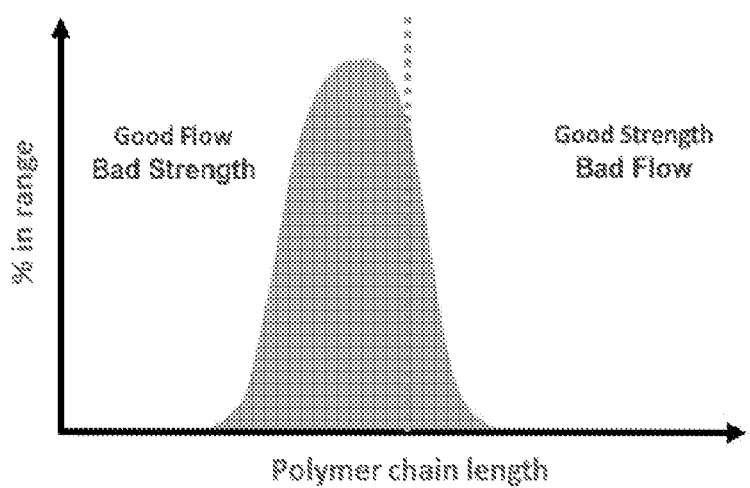
Figure 5C:
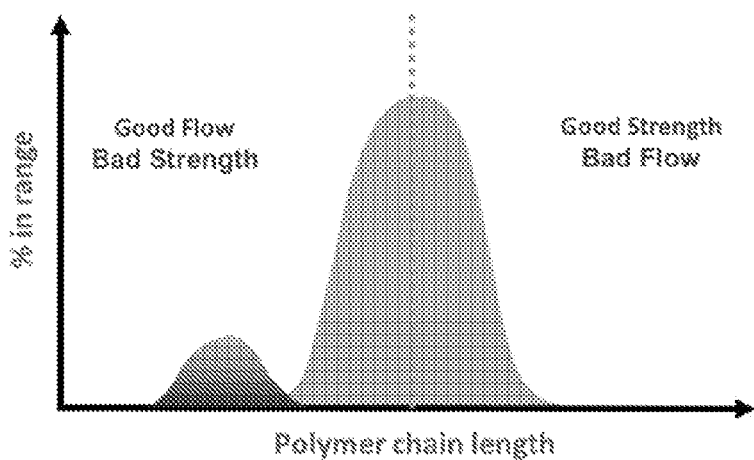

High molecular weight PET chains give good strength but poor flow. Normally, there is a trade-off whereby anything done to improve flow sacrifices strength. This PET alloy provides good flow and good strength. The PET alloy can be considered to be bimodal PET, which is shown in FIG. 5C. FIG. 5A shows an average molecular weight distribution of normal PET, where lower weights having good flow but bad strength and higher weights have good strength but bad flow. FIG. 5B shows a lower average molecular weight distribution that has more PET polymer having good flow and bad strength. In FIG. 5B the PET polymer chains have been shortened, such as by hydrolysis from the talc or water in the talc, to give good flow, but the PET has poor strength because the shorter chains are not long enough to entangle effectively. FIG. 5C shows the PET alloy having a portion with good flow but bad strength and a portion that is normal PET, where the lower molecular weight portion contributes to good flow of the alloy without significantly reducing strength. By producing the low molecular weight, high flow PET/talc mixture, and then combining a small fraction of the PET/talc mixture with virgin, high molecular weight PET, it was surprisingly found that the resulting PET alloy material having has very good flow while retaining excellent strength. The diagrams of FIGS. 5A-5C are for illustrative purposes only.

In one embodiment, a majority of the talc is associated with the PET polymers of the first portion of PET polymers. It has been found that the talc can reduce the molecular weight of PET, and thereby the PET in the PET/talc can have a smaller molecular weight that the PET that is used to form the PET/talc and/or used to form the PET alloy. The PET in the PET/talc can have the molecular weight of the first average molecular weight. The PET supplied to the system 100 or the system 200 can have the second average molecular weight.

In one embodiment, the PET alloy includes the talc that is inhomogeneously distributed throughout the PET. In some instance, the PET alloy can be prepared without thoroughly mixing the PET and PET/talc together such that some portion have more PET/talc that others. This may be helpful in facilitating processing of the PET alloy, such as in injection molding. Alternatively, the PET alloy includes the talc that is homogeneously distributed throughout the PET. It may be worthwhile to homogeneously mix the talc throughout the PET for some products where consistency and composition is important.

In one embodiment, the PET alloy includes talc particles from about 0.25 microns to about 100 microns, or about 0.5 microns to about 75 microns, or about 0.75 microns to about 0.5 microns, or about 1 microns to about 40 microns, or about 5 microns to about 30 microns, or about 10 microns to about 25 microns, or about 15 microns to about 20 microns.

In one embodiment, the PET alloy includes water at an amount less than 5%, or less than 1%, or less than 0.1%, or a trace amount of water or is devoid of water.

In one embodiment, the PET alloy has a PET concentration of about 60% to about 99%, about 70% to about 95%, about 75% to about 90%, or about 80%.

In one embodiment, the PET alloy has a talc concentration of about 1% to about 40%, about 5% to about 30%, about 10% to about 25%, or about 20%.

In one embodiment, the PET alloy has an intrinsic viscosity of from about 0.5 to about 0.9, or about 0.6 to about 0.8, or about 0.625 to about 0.7, or about 0.65 to about 0.675.

The PET alloy may include an optional component. The optional component can be selected from a filler, $TiO_2$, second polymer, glass pellets, glass fibers, glass particles, sodium ionomers, sodium stearate, nucleating agent, polycarbonate, polybutylene terephthalate (PBT) or other polyalkylene terephthalate (PAT), or other component of a PET article of manufacture 302. In one aspect, the PET alloy includes $TiO_2$.

In one embodiment, the PET alloy has a combination of talc and $TiO_2$ particles at a combined concentration of about 1% to about 40%, about 5% to about 30%, about 10% to about 25%, or about 20%. In one embodiment, the PET alloy has $TiO_2$ particles at a concentration of about 1% to about 40%, about 5% to about 30%, about 10% to about 25%, or about 20%. In one embodiment, the PET alloy has an optional component at a concentration of about 1% to about 40%, about 5% to about 30%, about 10% to about 25%, or about 20%.

In one embodiment, the PET alloy has a melting temperature between about 240° C. to about 250° C., or about 245° C.

In one embodiment, the PET alloy has an oxygen permeation rate of about 3-6 CC/ ($m^2$-day), +/−25%, 20%, 15%, 10%, 5%, 2%, or 1%. In one aspect, the PET alloy has about 10% (w/w) talc such that the PET alloy has an oxygen permeation rate of about 3.6 CC/(m2-day), +/−25%, 20%, 15%, 10%, 5%, 2%, or 1%. In one aspect, the PET alloy has about 20% (w/w) talc such that the PET alloy has an oxygen permeation rate of about 5.6 CC/(m2-day), +/−25%, 20%, 15%, 10%, 5%, 2%, or 1%.

In one embodiment, the PET alloy has a crystallization temperature between about 200° C. to about 230° C., or about 210° C. to about 220° C., or about 212° C.

Figure 4:
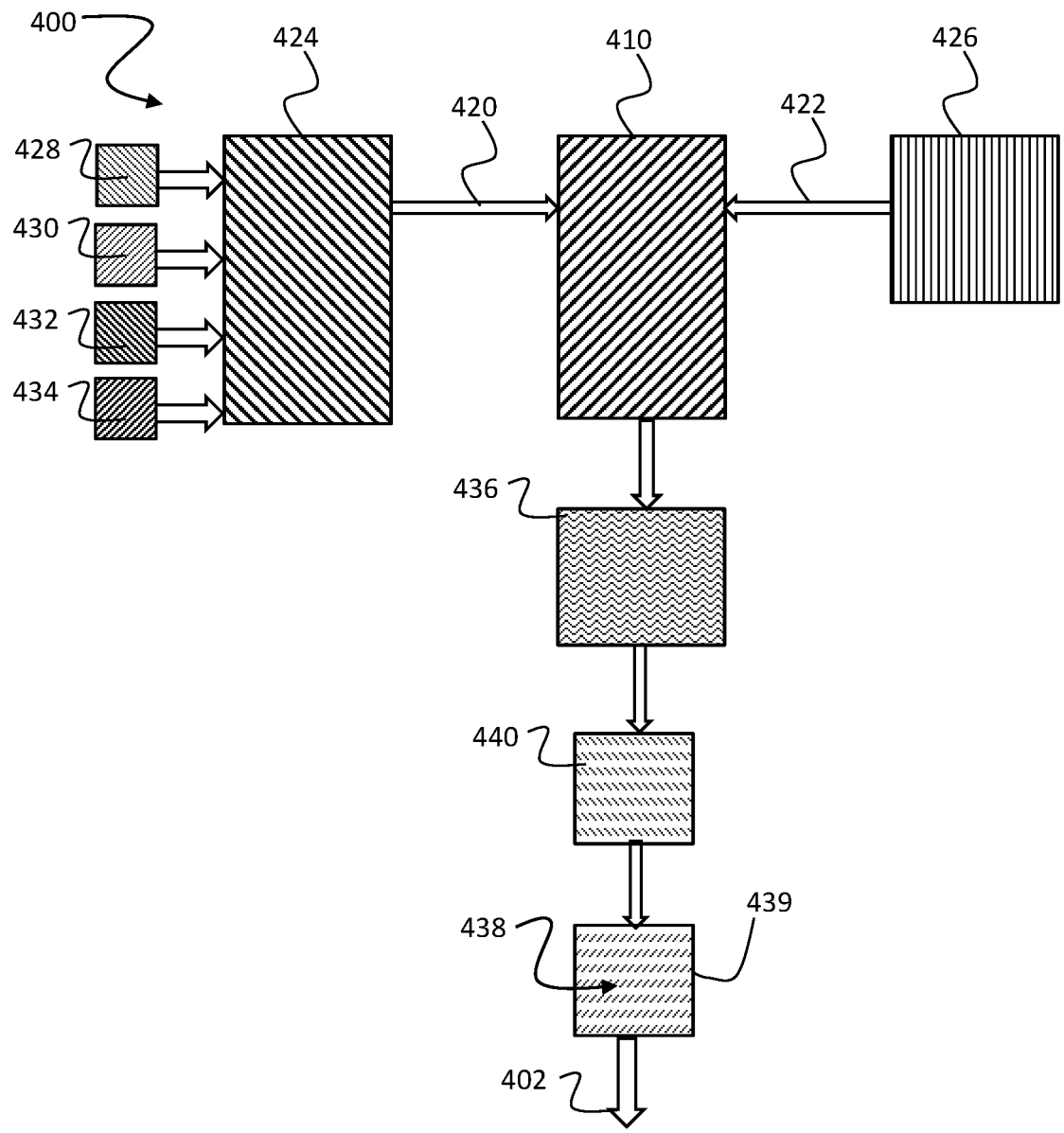
FIG. 4 is a schematic representation of an injection molding system for preparing a PET alloy into an injection molded article.

In one embodiment, the PET alloy can be used for injection molding to form articles of manufacture. As such, an injection molding system 400 may include a feed of PET alloy 420, such as shown in FIG. 4, in order to form an injection molded article of manufacture 402 that includes the PET alloy. The PET alloy feed 420 may be liquid PET alloy (e.g., melted PET alloy). However, the injection molding system 400 may include a PET alloy heater 424 that heats the PET alloy feed 420 for flowability as a liquid PET alloy. The heater 424 may receive PET alloy as a pellet 428, heated liquid PET alloy 430, or as PET 432 along with PET/talc 434 which is mixed in the heater 424 that is configured as a mixer, such as a mixer described herein. The heater 424 can provide the PET alloy feed 420 to an extruder 410. Optionally, a dried and/or filtered PET alloy pellet feed 422 may be provided to the extruder 410 from a PET alloy drying and/or filtering device 426.

The PET alloy can be processed in the injection molding system 400 and through an inline filtration system in the injection molding system. The PET alloy pellets can be fed into the system 400 through a drying hopper, which in turn feeds an inlet end of a plasticizing screw of the extruder 410. The plasticizing extruding screw is encapsulated in a barrel which is heated by barrel heaters (i.e., the extruder 410). Helical (or other) flights of the screw convey the PET alloy along an operational axis of the screw. Typically, a root diameter of the screw is progressively increased along the operational axis of the screw in a direction away from the inlet end. Once a desired amount of the PET alloy melt is accumulated in the extruder, 410 it is transferred into a melt accumulator 440, wherein the melt accumulator 440 can be equipped with an injection plunger, which performs the injection function of the melted PET alloy into a mold cavity 438.

A melt filter 436 located in fluid communication with and between the extruder 410 and the melt accumulator 440 performs the inline filtration of step. The purpose of the melt filter 436 is to filter impurities and other foreign matters from the PET alloy material being transferred from the extruder 410 to the melt accumulator 440. The specific implementation for the melt filter is not specifically limited and, as an example, an off-the-shelf filter from Gneuss Inc. of Matthews, N.C. (www.gneuss.com) can be used to implement the melt filter 436.

The inline filtration step may be performed in the melt filter 436 having an inlet for allowing an inflow of the PET alloy to be filtered, and a filter outlet to allow for an outflow of the filtered PET alloy. The melt filter 436 includes a filtering member disposed between the filter inlet and filter outlet.

The mold 439 receives the PET alloy so as to fill the mold cavity 438. This is an advance over prior PET that is not sufficiently injected by such an injection molding system. Now, the mold cavity 438 can be completely filled with the PET alloy without air gaps that min an injection molded product. This allows the PET alloy to be injection molded into a molded PET article of manufacture 402.

In one embodiment, a mold system can include a mold 439 having a mold cavity 438. The PET alloy can have PET comprising a first portion of PET polymers having a first average molecular weight and a second portion of PET polymers having a second average molecular weight, wherein the first average molecular weight is less than the second average molecular weight. The PET alloy can have talc in the PET, wherein the talc is present in an amount of at least 1% and less than 50%. The PET alloy completely fills the mold cavity 438 of the mold 439.

The systems and methods described herein provide a novel PET alloy that can be used to prepare a number of PET products, and may be used in various processing techniques, such as injection molding. This allows the PET alloy to be injected into a mold to form an article having thin walls. Additionally, the PET alloy allows for injection molding because the cycle time from liquid PET alloy to solid PET alloy is significantly reduced compared to PET cycle times.

The PET alloy also has an improved heat distortion temperature compared to PET. The PET heat distortion temperature (HDT) may be above 66° C. at 0.46 MPa (i.e., 66 psi) and thereby may range from 68° C. at 0.46 MPa to about 95° C. at 0.46 MPA, or about 70° C. at 0.46 MPa to about 90° C. at 0.46 MPa, or about 72° C. at 0.46 MPa to about 88° C. at 0.46 MPa. This allows an article of manufacture having the PET alloy to be articles that can contain or retain hot materials, such as hot liquid drinks, and thereby the PET alloy can be used to prepare hot beverage containers as an article of manufacture. Additionally, many manufacturing processes fill a container with a hot material, and then the hot material is cooled while in the container, and now the improved HDT of the PET alloy allows the PET alloy to be used as such a container in a manufacturing process to receive hot liquids therein. The PET alloy retains the shape of the container without buckling or other unfavorable distortion. In one aspect, the PET alloy has a sufficient HDT, which allows the PET alloy to form articles that are dishwasher safe. In one aspect, the PET alloy has a sufficient HDT, which allows the PET alloy to form articles that are microwave safe. The PET alloy exhibits easy snap-ability making it useful in scored end products, such as yogurt multi-packs and medical blister packs as well as related products.

While PET has been described herein, the systems and methods may also be used to prepare a Polyalkylene Terephthalate (PAT).

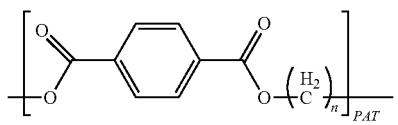

In the Polyalkylene Terephthalate (PAT) structure, n may be any reasonable integer, such as 1 (Polymethylene Terephthalate (PMT)), 2 (Polyethylene Terephthalate (PET)), 3 Polypropylene Terephthalate (PPT), 4 (Polybutylene Terephthalate (PBT)), or 5 Polypentylene Terephthalate (PPentT), or the like (e.g., n is 6, 7, 8, 9, 10, etc.). As such, the methods and systems described herein can be adapted for use with any suitable polyalkylene. That is the PET in the PET/talc may be substituted with any PAT so as to form PAT/talc. The PET in the PET alloy may be substituted with any PAT so as to form the PAT alloy. In some instances, the PAT/talc may include a first PAT (e.g., PET), and the virgin PAT mixed with the PAT/talc may include a second different PAT (e.g., PBT), such that the PAT alloy has two different PATs with the talc.

Accordingly, while the systems and methods described herein are directed to PET, such systems and methods may include any reasonable PAT, such as PBT.

Experimental

The PET alloy was prepared by first preparing the PET/talc mixture, and then preparing the PET alloy. A comparison was performed between PET (e.g., no talc), PET/talc having 50% by weight PET and 50% by weight talc, PET/talc having 80% PET and 20% talc by weight, and the PET alloy having 80% PET and 20% talc by weight. The parameters are shown in Table 1.

TABLE 1

|  | % PET/% Talc | IV | % Crystallinity |
| --- | --- | --- | --- |
| PET | 100/0 | 0.684 | 39.7 |
| PET/talc | 50/50 | 0.361 | 27.92 |
| PET/talc 2 | 80/20 | 0.482 | 13 |
| PET Alloy | 80/20 | 0.664 | 34.4 |

Table 1 shows that the IV (Intrinsic Viscosity), which indicates of the size of the molecules within the polymer for: PET; PET/talc with 50% (by weight) talc in the un-dried PET; PET/talc 2, which is the polymer with 20% talc directly added to the PET without intermediate steps to produce the alloy; and PET alloy. As can be seen by the numbers, the PET alloy has lower crystallinity and a lower IV. The direct addition example has too low of an IV to be useful in the end products produced by injection molding. Thus, the PET alloy provides a significant benefit.

A comparison study was conducted to test the flow differences between the PET alloy having talc versus PET without any talc. The fork tested was a 0.023" thickness fork, and the fork mold was tested on a 250 MT Krauss Maffei injection molding machine. The PET alloy filled the mold, but PET did not fill the mold even when attempting to maximizing the pressure and increasing cycle time. Thus, now PET alloy can be used in injection molding because it can fill the mold space without unfavorable air gaps.

Figure 6A:
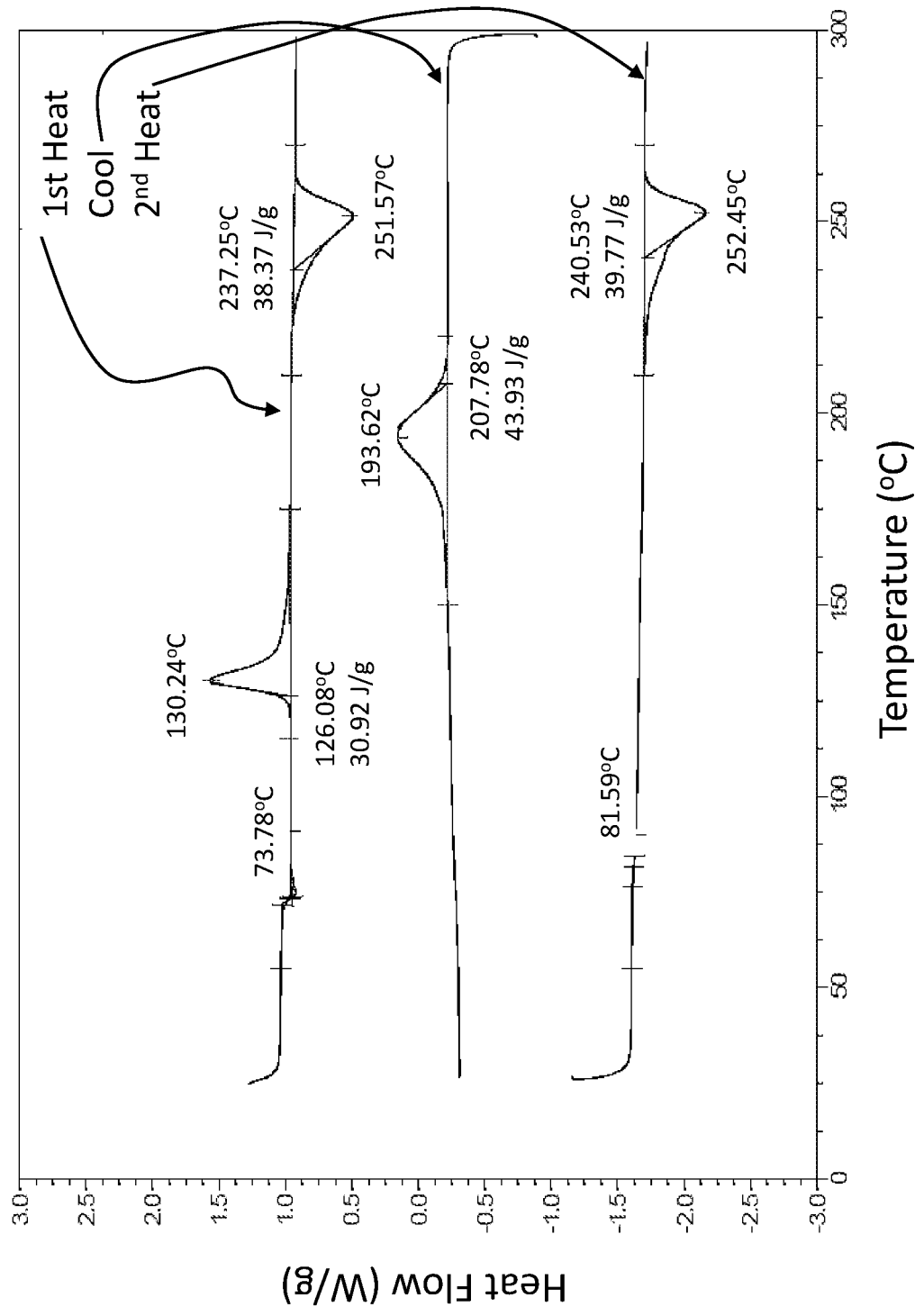
FIG. 6A includes a graph that shows the differential scanning calorimetry DSC data for PET.
Figure 6B:
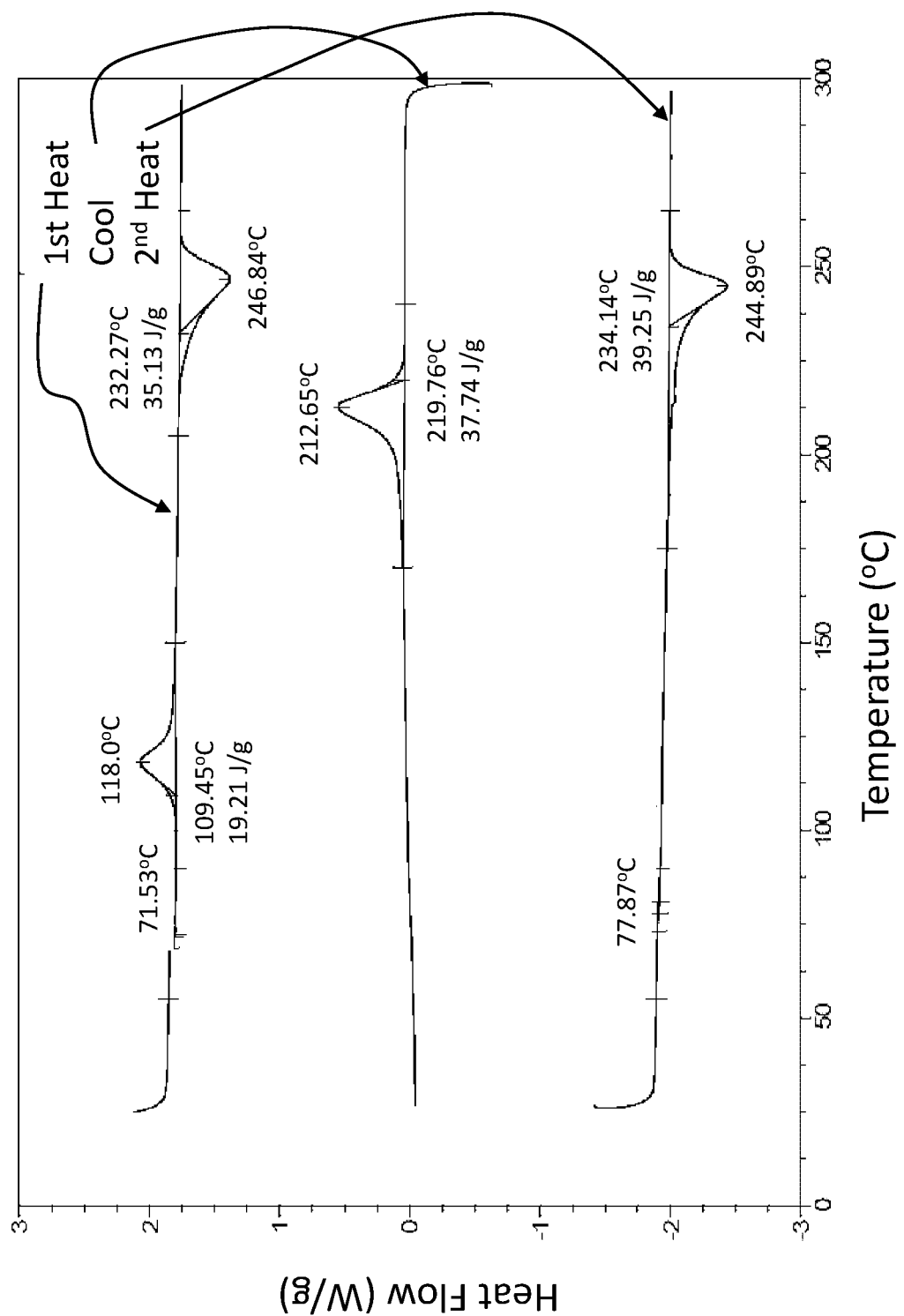
FIG. 6B includes a graph that shows the DSC data for PET having talc.
Figure 6C:
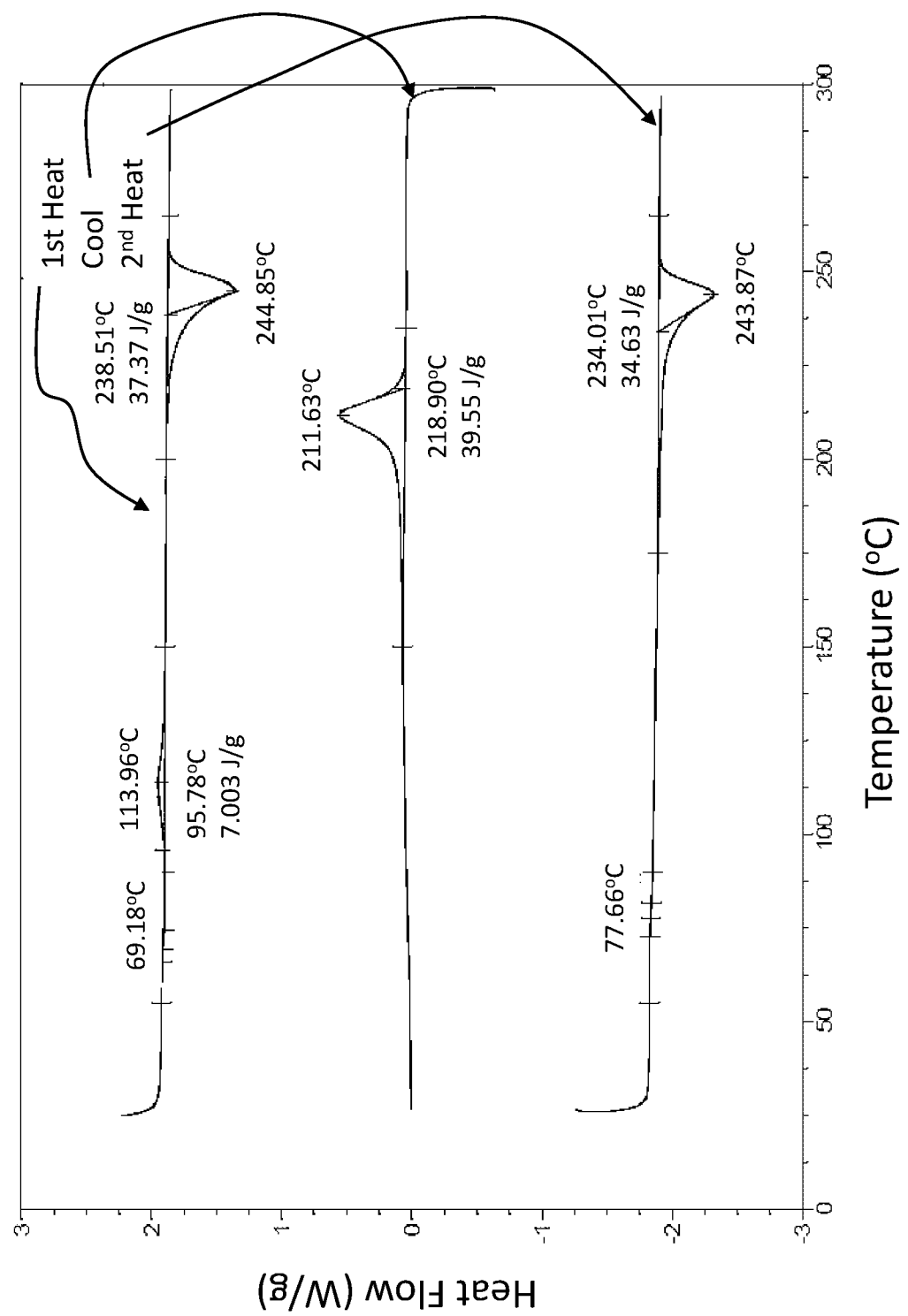
FIG. 6C includes a graph that shows the DSC data for PET having talc formed at 110° C.
Figure 6D:
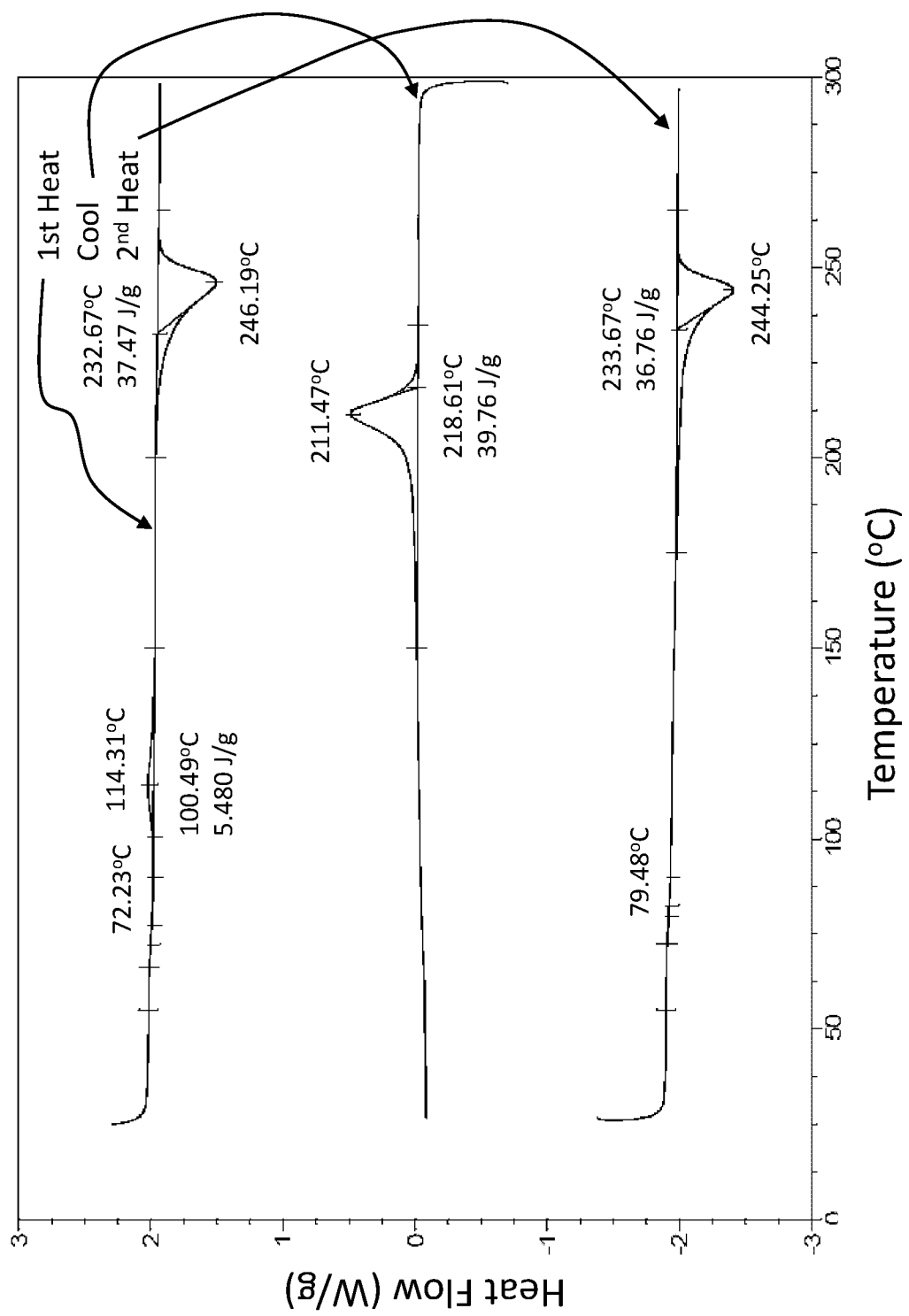
FIG. 6D includes a graph that shows the DSC data for PET having talc formed at 120° C.
Figure 6E:
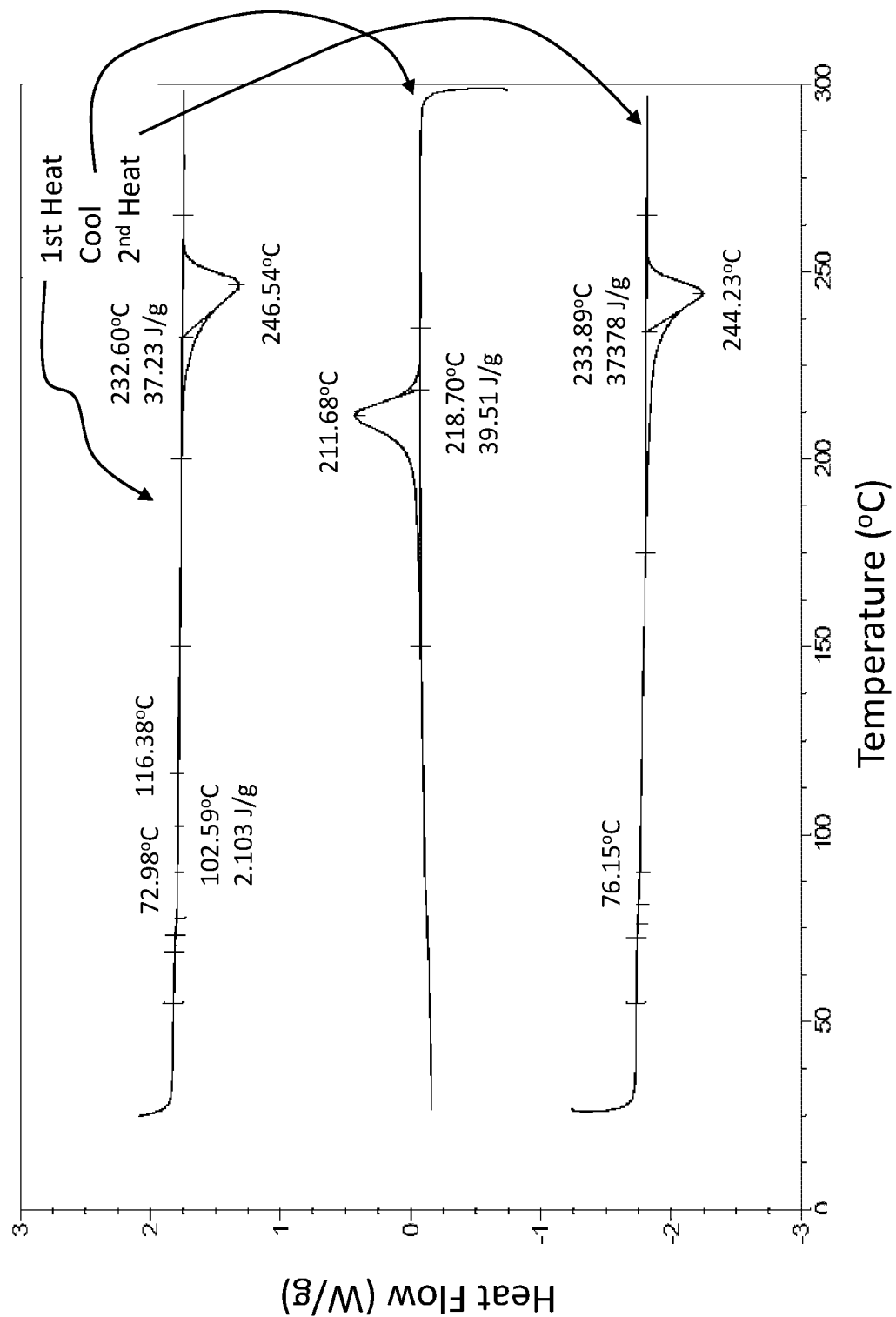
FIG. 6E includes a graph that shows the DSC data for PET having talc formed at 125° C.
Figure 6F:
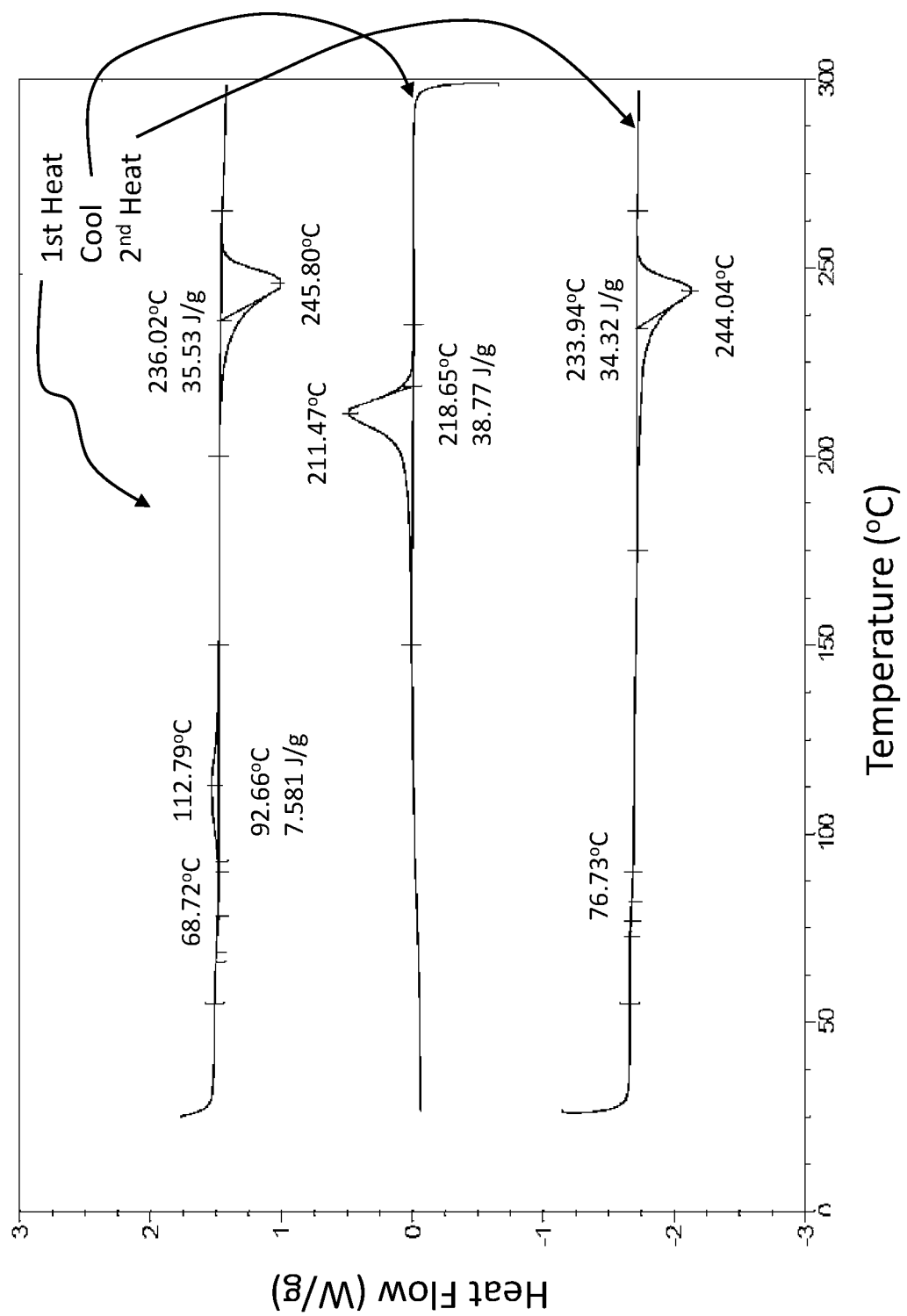
FIG. 6F includes a graph that shows the DSC data for PET having talc formed at 105° C.

PET alloy was prepared and tested using differential scanning calorimetry (DSC) in accordance with standard procedures. The following were tested: PET; talc filled PET sheet; thermoformed PET alloy at 110° C. (110 PET alloy); thermoformed PET alloy at 120° C. (120 PET alloy); thermoformed PET alloy at 125° C. (125 PET alloy); and thermoformed PET alloy at 105° C. (105 PET alloy). FIG. 6A shows an overlay of the DSC thermograms for PET. FIG. 6B shows an overlay of the DSC thermograms for talc filled PET sheet. FIG. 6C shows an overlay of the DSC thermograms for 110 PET alloy. FIG. 6D shows an overlay of the DSC thermograms for 120 PET alloy. FIG. 6E shows an overlay of the DSC thermograms for 125 PET alloy. 6F shows an overlay of the DSC thermograms for 125 PET alloy. The date provided the following information shown in FIG. 7. Additionally, the following percent crystallinity was determined: PET 5.3%; talc filled PET sheet 13.5%; thermoformed PET alloy at 110° C. (110 PET alloy) 25.8%; thermoformed PET alloy at 120° C. (120 PET alloy) 27.2%; thermoformed PET alloy at 125° C. (125 PET alloy) 29.5%; and thermoformed PET alloy at 105° C. (105 PET alloy) 23.8%. The PET alloy included 16% talc. As such, higher or lower amounts of talc can adjust the values toward the PET values when less talc and further away from the PET values with more talc.

It was found that the presence of talc filler generally reduced the thermal transition temperatures. In the first heating cycles, the melting temperature of the unfilled PET Sheet (PET only) was about 252° C. while the other samples melted between 245° C. and 247° C. Other transitions in both heating cycles were similarly affected. The crystallinity was observed to be dependent on the processing temperature. The samples exhibited increasing crystallinity with increased temperature. The increased crystallinity proves that the talc is nucleating the PET crystallization. Increased crystallinity is well-known to improve yield strength and barrier properties (crystal are impermeable). Most importantly, to get high HDT the PET needs significant crystallinity plus a reinforcing filler such as talc, which is achieved with the PET alloy having talc.

FIG. 8 shows the gas permeability data for PET (control), PET alloy with 10% talc (VF2), and PET alloy with 20% talc (VF4). This data shows that standard PET has an oxygen transmission rate of 8.67 $CC/(m^2$-day), whereas the PET alloy materials have values 35% and almost 60% lower. Permeability of other gases will change by the same amounts. The reduced gas permeability can be useful for food packaging applications as it helps keep the food fresh longer, which shows the PET can be utilized in food containers. Dilute solution viscometry was performed with PET, PET 20% talc (e.g., PET containing 20% by weight talc), and PET alloy (e.g., PET containing 50% by weight talc at 40% and PET at 60%). The sample mass of each specimen was adjusted to account for filler content as appropriate. Portions of each sample were dissolved with heating in 60/40 phenol/1,1,2,2 tetrachloroethane containing isooctyl mercaptopropionate stabilizer. The solutions were heated for a total of 3 hours and 10 minutes. The solutions were then filtered through wire mesh and viscosities were measured in Ubbelohde 1B viscometers at 30.00° C. Inherent viscosity is reported as follows, as is intrinsic viscosity calculated using the Billmeyer Approximation. PET had inherent viscosity of 0.654 (dL/g) and 0.684 intrinsic viscosity (dL/g). PET 20% talc had inherent viscosity of 0.467 (dL/g) and 0.482 intrinsic viscosity (dL/g). PET alloy had inherent viscosity of 0.636 (dL/g) and 0.664 intrinsic viscosity (dL/g). These three PET compositions were also tested with DSC, which resulted in the data in FIG. 9. The crystallinity for these three PET compositions was determined as: PET 30.7%; PET 20% Talc 13.0%; and PET alloy 34.4%. The PET 20% talc and PET alloy compositions underwent size exclusion chromatography, which resulted in the data of FIG. 10. The refractive index (RI) chromatograms, cumulative molar mass distribution plots, and differential molar mass distribution were compared to the calibration curve to determine the molar mass averages (Mn (number average), Mw (weight average), and Mz (Z average) and polydispersity (Mw/Mn)). The data were indicative of the PET alloy having a higher molar mass than the PET 20% talc sample. The PET alloy also exhibited a larger polydispersity index, consistent with a more broad distribution. The neat PET sample, which was only tested for inherent viscosity, has a higher molar mass than the PET alloy and PET 20% talc samples. The PET 20% talc sample exhibited a melting peak at 247° C. The neat PET sample and the PET alloy each exhibited a bimodal melting peaks with maxima around 233° C. and 247° C., respectively. As-received crystallinity for the PET 20% talc sample was substantially lower at 13% as compared to crystallinity of the neat PET (40%) and the PET alloy (34%).

The molecular weights can be defined as shown in the examples. The blending of a small amount of lower molecular weight PET with a large fraction of high molecular weight PET should hold valid no matter what the molecular weights. However, for practical purposes, the mechanical properties, in particular strength will be too low if the higher molecular weight component has an insufficient molecular weight for entanglements to form. For example, the higher molecular weight fraction (e.g., virgin PET, or PAT) should have an IV over 0.55.

Figures 11, 13A, 13B:
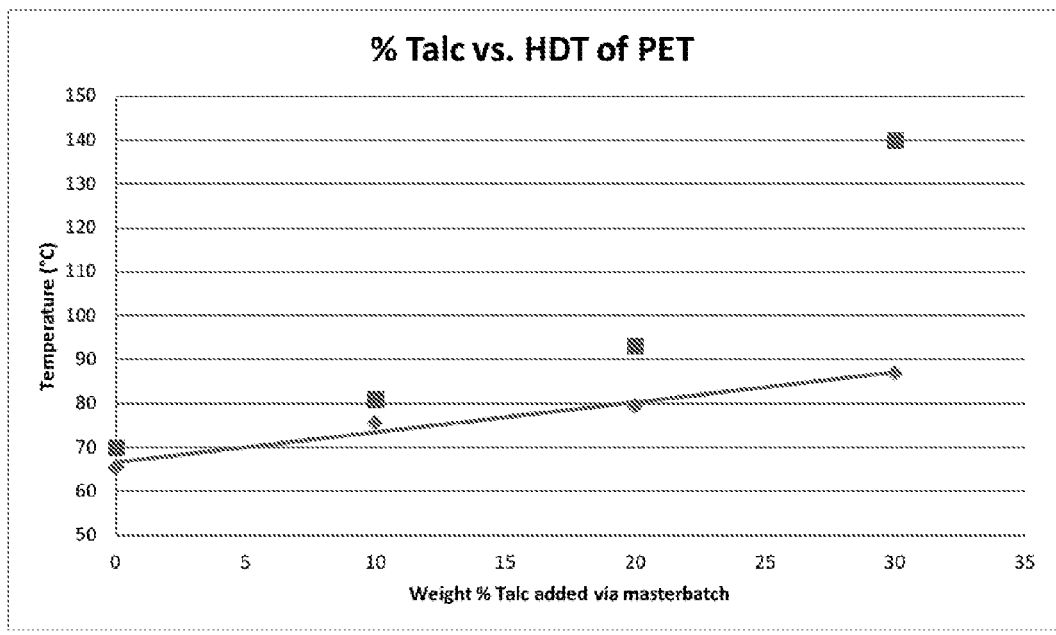
FIG. 11 includes a graph that shows the heat deformation temperature (HDT) of PET and PET alloys having various amounts of talc.
FIG. 13A includes a table showing mechanical properties for PET alloy.
FIG. 13B includes a table showing mechanical properties of general purpose poly styrene (GPPS).

Additionally, the HDT was tested for PET and PET alloy having talc over a range of weight percent of talc, which is shown in FIG. 11. Accordingly, the HDT increased as the amount of talc increased, which shows that the PET alloy can be used for products with higher temperatures of use than PET. FIG. 12 shows that adding a glass fiber further increases the HDT, increases the flexural modulus (Kpsi), and flexural strength (psi).

Additionally, the PET alloy (FIG. 13A) was compared to general purpose polystyrene (GPPS) (FIG. 13B) to study mechanical properties. The PET alloy show better mechanical properties than GPPS, and the PET alloy can be prepared at comparable costs. Thus, the PET alloy prepared by the systems and methods described herein from the PET and PET/talc two-stage preparation can be a useful plastic for preparing a number of articles of manufacture in a wide range of manufacturing techniques. Now, the PET alloy can be used in injection molding to prepare thin walled molded articles.

The PET/talc was prepared as described herein for use in the experiments. An example of such a process is provided. The PET feed at 60% and talc feed at 40% were provided to extruder having a barrel temperature between about 517° F. and 565° F. (e.g., over 500° F.) and mixed as the mixture pushed through the extruder. The head pressure was about 370 psi, suction pressure of 293 psi, discharge pressure of 424 psi, and melt pressure of 266 psi. The extruder was operated at 145.5 RPM, with a torque of 49.7, a gear pump having 17 RPM with a torque of 7.1. There were various die zones having the temperature at about 530° F. Throughput was about 1098 lbs/hour. The intrinsic viscosity was about 0.656. Various percentages of PET and talc can be prepared with similar operating parameters.

Additionally, the PET/talc was mixed with virgin PET using similar operating parameters, with some variations, to prepare the PET alloy. These parameters values for preparing the PET/talc or PET alloy may vary by +/−1, 2, 3, 5, 10, 15, 20, 25, 30 or 50%. The PET alloy was used successfully for injection molding, where the PET alloy filled the mold. While a single cavity hot runner was used as an example, multiple cavities have also been successfully used. The molding machine was a KM 120, with a sprue radios of 3.4" and 9.32" orifice. The barrel temperature was 470° F., 465° F., 460° F., 455° F., and 445° F. along the length. The injection speed was about 2 inches/second, with a 7500 psi injection pressure setting, and holding pressure of 5000 psi. The plasticizing speed was about 200 RPM. The cooling time was about 2 seconds with an 8.67 second cycle time. The injection time was about 0.44 seconds. The mold cooling temperature was about 65° F. at the front and 90° F. at the rear. The gate was a 0.031 pin gate. This shows that the PET alloy can be used in injection molding to make a variety of injection molded products, from utensils, food containers, hot product containers, plates, and other articles of manufacture.

For an injection molded fork, the cycle time for PP copolymer was 7.1 seconds whereas the PET alloy material described herein can be molded in 6.2 seconds. Furthermore, the PP fork was too thin and of insufficient stiffness to be useable as a fork whereas the PET alloy material gave a stiffer, useable fork. Mold temperature was changed between 100° F. and 60° F. Valve gate was about 650° F. Further reducing the mold temperature to just 50° F. gave a cycle time of just 5.9 seconds. Black color was added to the PET alloy material via masterbatch concentrate. The color was even and cycle times were unaffected. All trials were done over many shots and steady state conditions to assure repeatability. This trial was performed in a 120 ton Krauss Maffei injection molding machine. Other successful trials were performed in different machines with a variety of gate/runner configurations. The PET alloy fork weight averaged 2.8 g, whereas the PP fork produced in the same mold weighed 1.7 g.

In a separate trial, general purpose polystyrene was compared to the PET alloy material. The trial used an Ineos Styrolution 3600/3601 grade general purpose polystyrene (GPPS) commonly used for cutlery production. The molding process for GPPS was refined to an 8.67 second overall cycle time. The fork had a wall thickness of 0.023 which is adequate for the modified PET but produced a weak, brittle general purpose polystyrene fork. A 0.026 diameter hot pin gate was used. The cycle time for the PET alloy material was 9.6 seconds.

Further trials were run utilizing a 1991 350 ton Krauss Maffei injection molding machine with hydraulic clamping and a twenty-four ounce barrel. A twenty-five cavity spoon mold of the so-called "hot-to-cold" type was used. The PET alloy material with 15% and 20% talc both resulted in good quality molded parts and cycle times.

For this and other processes and methods disclosed herein, the operations performed in the processes and methods may be implemented in differing order. Furthermore, the outlined operations are only provided as examples, and some operations may be optional, combined into fewer operations, eliminated, supplemented with further operations, or expanded into additional operations, without detracting from the essence of the disclosed embodiments.

The invention claimed is:

1. A method of forming a Polyethylene Terephthalate (PET) alloy having talc, the method comprising:
providing a feed of the PET/talc mixture (PET/talc feed), wherein the PET/talc mixture is obtained by:
providing a feed of PET (PET feed);
providing a feed of talc (talc feed); and
mixing the feed of PET with the feed of talc in a mixer at a PET:talc ratio of 3:1 to 1:3 by weight to form a PET/talc mixture that is devoid of another type of polymer, wherein the PET/talc mixture includes a PET having a first average molecular weight of a first distribution of PET;
providing a second feed of PET (second PET feed), wherein the second PET feed includes a PET having a second average molecular weight of a second distribution of PET, wherein the second average molecular weight is higher than the first average molecular weight;
mixing the second feed of PET with the feed of PET/talc mixture in a mixer to form a PET alloy having from about 1% (w/w) talc to about 50% talc (w/w) that is devoid of the another type of polymer; and
providing the PET alloy as bimodal PET having the first average molecular weight of the first distribution of PET and the second average molecular weight of the second distribution of PET.

2. The method of claim 1, wherein a PET supply receives the PET feed or second PET feed from one or more of:
a PET reactor system, the PET reactor system polymerizes the PET from PET precursor reagents;
a PET recycling system recycles the PET from PET articles;
a PET conditioning system conditions the PET for mixing with PET/talc, the conditioning selected from one or more of heating, chopping PET pellets or sheets or other PET member, agitating, extruding, drying; off-gassing; or
a PET reservoir of liquid PET, wherein the liquid PET is melted PET.

3. The method of claim 1, wherein the mixer also performs one or more of: degassing, homogenizing, dispersing, or heating.

4. The method of claim 1, comprising providing the PET alloy to an output system, wherein the output system provides the PET alloy to storage or an analytical system or manufacturing system, wherein the analytical system includes one or more analytical systems capable of:
determining intrinsic viscosity of melted PET alloy output;
determining flow rate of melted PET alloy output;
determining melting point of PET alloy output;
determining crystallization temperature of PET alloy output;
determining a differential scanning calorimetry profile of PET alloy output; or
determining heat distortion temperature of PET alloy output.

5. The method of claim 4, wherein the manufacturing system is configured to convert the PET alloy output into an article of manufacture, the method comprising converting the PET alloy output into the article of manufacture.

6. The method of claim 1, comprising:
drying the second PET feed before mixing with the PET/talc feed; and/or
drying the PET/talc feed before mixing with the second PET feed.

7. The method of claim 1, wherein the talc includes talc particles from about 0.25 microns to about 100 microns.

8. The method of claim 1, wherein the PET/talc mixture includes water at an amount less than 5%.

9. The method of claim 1, wherein the PET/talc mixture has a PET concentration of about 20% to about 80%.

10. The method of claim 1, wherein the PET/talc mixture has a talc concentration of about 20% to about 80%.

11. The method of claim 1, wherein the PET/talc mixture has an intrinsic viscosity of from about 0.25 dL/g to about 0.7 dL/g.

12. The method of claim 1, the bimodal PET alloy further comprising one or more of: $TiO_2$, glass pellets, glass fibers, glass particles, sodium ionomers, sodium stearate, nucleating agent, anti-static agents, anti-bacterial agents, foaming agents, stabilizers, UV blockers, acetaldehyde scavengers, pigments, or lubricants.

13. The method of claim 1, wherein a majority of the talc is associated with the first distribution of PET.

14. The method of claim 1, wherein the PET alloy includes water at an amount less than 5%.

15. The method of claim 1, wherein the PET alloy has a PET concentration of about 60% to about 99%.

16. The method of claim 1, wherein the PET alloy has a talc concentration of about 1% to about 40%.

17. The method of claim 1, wherein the PET alloy has an intrinsic viscosity of from about 0.5 dL/g to about 0.9 dL/g.

18. The method of claim 1, wherein the PET alloy has a combination of talc and $TiO_2$ particles at a combined concentration of about 1% to about 40%.

19. The method of claim 1, wherein the PET alloy has a melting temperature between about 240° C. to about 250° C.

20. The method of claim 1, wherein the PET alloy has an oxygen permeation rate of about 3-6 $CC/(m^2\text{-day})$, +/−25%.

21. The method of claim 1, wherein the PET alloy has a crystallization temperature between about 200° C. to about 230° C.

* * * * *